(12) United States Patent
Sato et al.

(10) Patent No.: US 7,034,312 B2
(45) Date of Patent: Apr. 25, 2006

(54) RADIATION DETECTOR

(75) Inventors: Kenji Sato, Shiga-ken (JP); Toshiyuki Sato, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 0 days.

(21) Appl. No.: 11/241,931

(22) Filed: Oct. 4, 2005

(65) Prior Publication Data

US 2006/0027757 A1    Feb. 9, 2006

Related U.S. Application Data

(63) Continuation of application No. 10/629,676, filed on Jul. 30, 2003, now Pat. No. 6,995,375.

(30) Foreign Application Priority Data

Aug. 30, 2002   (JP)   ............................. 2002-253819
Mar. 5, 2003    (JP)   ............................. 2003-58487

(51) Int. Cl.
   *H01L 27/146* (2006.01)
(52) U.S. Cl. ................................. 250/370.09
(58) Field of Classification Search ............ 250/370.09
   See application file for complete search history.

(56) References Cited

U.S. PATENT DOCUMENTS

| | | | |
|---|---|---|---|
| 5,937,027 A | 8/1999 | Thevenin et al. | |
| 6,194,727 B1 * | 2/2001 | Lee et al. | ............... 250/370.09 |
| 6,600,157 B1 | 7/2003 | Watanabe et al. | |
| 2001/0025938 A1 | 10/2001 | Imai | |
| 2004/0022352 A1 | 2/2004 | Suzuki | |

FOREIGN PATENT DOCUMENTS

| | | |
|---|---|---|
| JP | 09-009153 A1 | 1/1997 |
| JP | 10-085207 A1 | 4/1998 |
| JP | 2002-040144 A1 | 2/2002 |
| WO | WO 02/34135 A1 | 5/2002 |

OTHER PUBLICATIONS

European Search Report, Application No.: 03017081.5-2213 PCT/, dated Jul. 20, 2005.

* cited by examiner

*Primary Examiner*—David Porta
*Assistant Examiner*—Marcus Taningco
(74) *Attorney, Agent, or Firm*—Rader, Fishman & Grauer, PLLC

(57) ABSTRACT

A radiation detector for detecting a spatial distribution of incident radiation includes a radiation-sensitive semiconductor, a common electrode formed on one surface of the semiconductor for receiving a bias voltage, a plurality of split electrodes formed on the other surface of the semiconductor for outputting, as electric signals, charges generated within the semiconductor by the incident radiation, and a light irradiating mechanism for emitting light at least during a detection of the radiation.

36 Claims, 17 Drawing Sheets before incidence of radiation during incidence of radiation

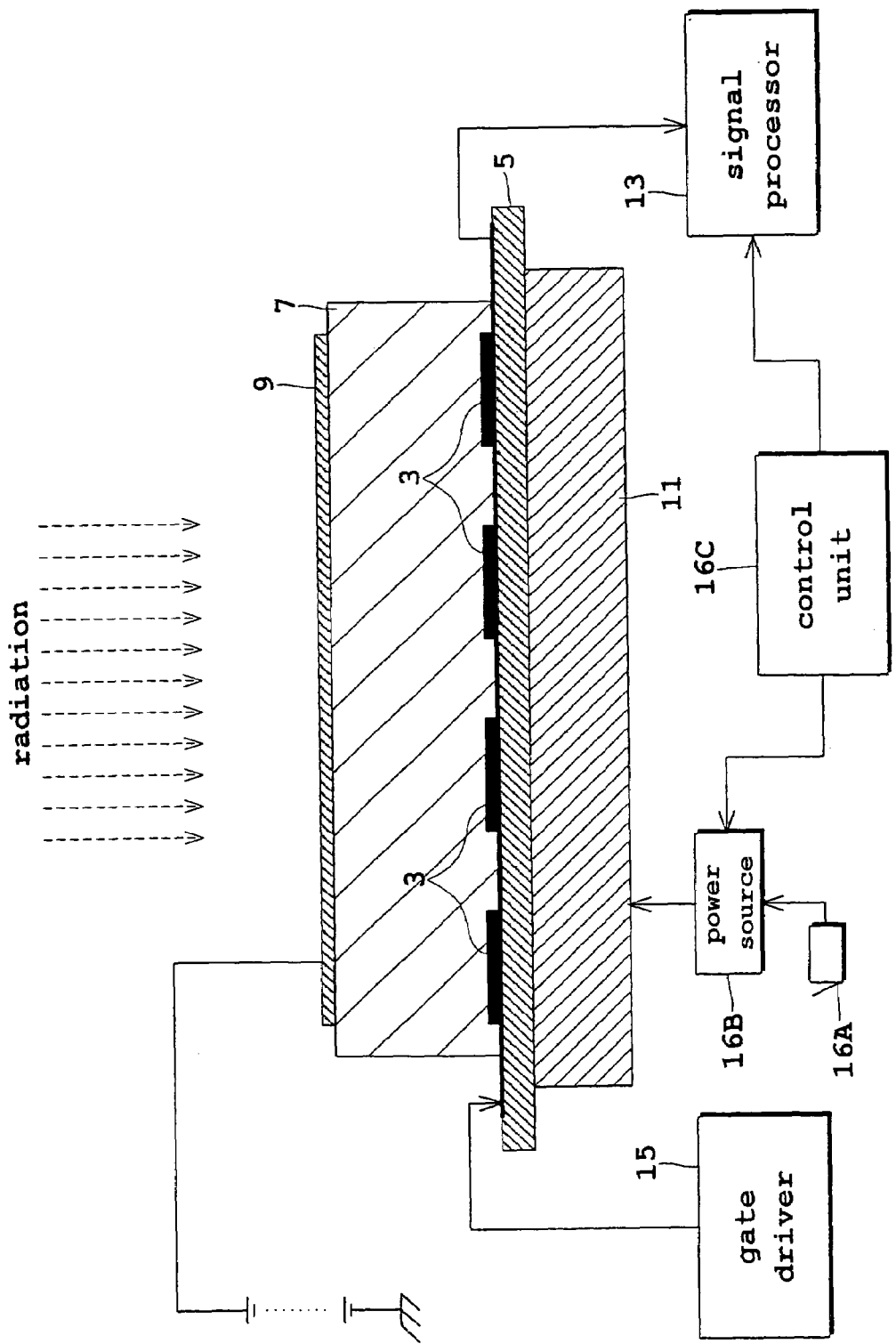

RADIATION DETECTOR

The present application is a continuation application of the patent application Ser. No. 10/629,676, filed on Jul. 30, 2003, now U.S. Pat. No. 6,995,375, which is based on priority documents JP2002-253819 filed on Aug. 30, 2002 and JP2003-058487 filed on Mar. 5, 2003, the entire contents of which are incorporated herein by reference.

BACKGROUND OF THE INVENTION (1) Field of the Invention

This invention relates to a radiation detector for measuring a spatial distribution of radiation in the medical, industrial, nuclear and other fields.

(2) Description of the Related Art

A known radiation detector has a common electrode formed on one surface of a semiconductor sensitive to radiation, with a bias voltage applied to the common electrode, and a plurality of split electrodes formed on the other surface of the semiconductor. Incident radiation generates electric charges within the semiconductor, and these charges are fetched through the respective split electrodes as electric signals. In this way, the radiation detector detects a spatial distribution of incident radiation. Such radiation detectors may be manufactured in various ways which may, broadly, be classified into the following three methods.

Firstly, a semiconductor film is formed on a substrate having split electrodes formed thereon beforehand, and then a common electrode is formed on the semiconductor film. Secondly, a semiconductor film is formed on a substrate having a common electrode formed thereon beforehand, and then split electrodes are formed on the semiconductor film. Thirdly, a common electrode is formed on one surface of a semiconductor crystal substrate, and split electrodes are formed on the other surface of the substrate.

The detector manufactured by the first method has a substrate disposed on the split electrode side. The other two types of detectors, generally, are also used by connecting the split electrodes to an electronic circuit board for processing signals. Since each of the above three types has a substrate disposed on the split electrode side, the conventional radiation detector generally detects radiation incident on the common electrode side.

The conventional detector constructed as described above has the following drawbacks.

The conventional radiation detector noted above has no electrodes for sweeping out the charges having been moved by an electric field to regions of space between the split electrodes. The charges generated by radiation tend to collect in those regions. Consequently, lines of electric force are distorted to vary an effective sensitive area, resulting in a sensitivity variation phenomenon. In this case, also after cessation of the incident radiation, the charges having collected in the regions of space between the split electrodes are gradually swept out to cause an undesirable phenomenon of after-output.

Furthermore, when an incidence of radiation takes place at a higher rate than a charge sweep-out, the charges collect also in regions having the split electrodes formed therein. This distorts an electric potential profile in the semiconductor to raise the electric potentials adjacent the split electrodes. In one example, an amorphous selenium (a-Se) film and a common electrode are formed on a substrate having a plurality of split electrodes and thin film transistors (TFT), and signals are successively read by switching operation of the TFTs. In this particular case, a high bias must be applied to the a-Se in use, and the potential rise adjacent the split electrodes becomes high enough to influence the switching operation of the TFTs. This results in phenomena such as of slow reading operation, and causes sensibility variations or after-outputs.

The above two phenomena will particularly be described hereinafter with reference to FIGS. 1 and 2. FIGS. 1 and 2 are sectional views schematically illustrating interior conditions of a conventional radiation detector.

FIG. 1A is a schematic view showing a state before an incidence of radiation. In this state, all lines of electric force run parallel inside a thick semiconductor film 51. Where each split electrode 53 has a width "a" and a length "y" in the direction of depth, a sensitive area is "axy". FIG. 1B is a schematic view showing a state occurring with an incidence of radiation. Of the charges (electrons and holes) generated in regions of space between the split electrodes 53, the charges (e.g. holes in FIG. 1B) moving toward the side having the split electrodes 53 are captured to stagnate (as at 55) adjacent surfaces of the thick semiconductor film 51, in the absence of electrodes for sweeping out the holes. In this way, the holes collect gradually to distort the lines of electric force in the thick semiconductor film 51. Where a space between each adjacent pair of split electrodes 53 has a width "b" and "z" in the direction of depth, a sensitive area in this case will be (a+b)×(y+z). Therefore, sensibility is varied (i.e. increased) from axy to (a+b)×(y+z) until the region of space between the split electrodes 53 is filled with the charges.

FIG. 2 shows a construction having an amorphous selenium (a-Se) film 65 and a common electrode 67 formed on a substrate 63 having a plurality of split electrodes 61 and thin film transistor (TFT) switches. The TFT switches are operable for successively reading signals. The amorphous selenium film has a thickness d. In FIG. 2A, which is a schematic view showing a state before an incidence of radiation, an electric potential adjacent the split electrodes 61 is sufficiently low. However, when an incidence of radiation takes place at a higher rate than the charge sweep-out, the charges collect adjacent the split electrodes 61. This distorts the electric potential profile to raise the electric potential adjacent the split electrodes 61 as shown in FIG. 2B. Since a high bias must be applied to the amorphous selenium film in use, the potential rise becomes high enough to cause malfunctioning of the TFT switches. This results in phenomena such as of slow reading operation, and causes sensibility variations or after-outputs.

Such sensibility variations make a quantitative radiation detection impossible. Moreover, when the detector is used for detecting a dynamic image, a phenomenon of gradual brightness variations occurs, and incident radiation doses cause different sensitivity variation curves, resulting in a phenomenon in which an image of a preceding frame remains as an after-image.

SUMMARY OF THE INVENTION

This invention has been made having regard to the state of the art noted above, and its object is to provide a radiation detector having split electrodes and free from sensibility variations, which is achieved by stabilizing an electric field generated in the radiation detector by light irradiation.

The above object is fulfilled, according to this invention, by a radiation detector for detecting a spatial distribution of incident radiation, comprising a radiation-sensitive semiconductor; a common electrode formed on one surface of the semiconductor for receiving a bias voltage; a plurality of split electrodes formed on the other surface of the semiconductor for outputting, as electric signals, charges generated within the semiconductor by the incident radiation; and a light irradiating mechanism for emitting light at least during a detection of the radiation.

The radiation detector according to this invention has a light irradiating mechanism for emitting light to the split electrode side. This mechanism emits light during a radiation detecting operation. Thus, as shown in FIG. 4, charges generated by the light (i.e. holes where a positive bias is applied to the common electrode 9) are already collected in regions of space between the split electrodes 3. Consequently, lines of electric force are distorted, and each sensitive area is (a+b)×(y+z) from the beginning. When an incidence of radiation takes place in this state, as shown in FIG. 5, the charges moving toward the split electrodes 3, of the charges generated in the regions of space between the split electrodes 3, follow the lines of electric force to reach the split electrodes 3. No additional charges will collect in the spaces between the split electrodes 3. Thus, no change occurs in the state of the lines of electric force or the sensitive areas, and hence no sensibility variations. The light emission may be continued after cessation of the incidence of radiation. Then, the charges collected in the regions of space between the split electrodes 3 are not swept out gradually, and no after-output occurs.

The light emission or irradiation herein includes all emission modes that produce the advantages of this invention, such as emitting light continuously or intermittently during a detection of the radiation.

Preferably, the light has a wavelength shorter than a wavelength corresponding to a band gap energy of the semiconductor used.

Since the irradiating light has a wavelength shorter than a wavelength corresponding to the band gap energy of the semiconductor used, the irradiating light does not penetrate deep inside the semiconductor, but operates only in portions very close to the surface forming the split electrodes. The charges generated by the light collect only in limited regions very close to the surface forming the split electrodes, thereby reducing insensitive regions.

Further, it is preferred that the light has a wavelength shorter than a wavelength that halves a transmittance of the semiconductor used, and longer than a wavelength corresponding to a band gap energy of the semiconductor.

Since the wavelength of the irradiating light is shorter than the wavelength that halves the transmittance and longer than the wavelength corresponding to the band gap energy of the semiconductor used, part of the irradiating light penetrates deep into the semiconductor to enlarge insensitive regions. However, since the irradiating light has a smaller energy than the band gap energy, the semiconductor is free from damage (generation of crystal defects) done by the irradiating light. No increase occurs in the dark current resulting from a charge detection by the irradiating light itself. Damaging of the semiconductor by the irradiating light is conspicuous with the amorphous semiconductor such as amorphous selenium (a-Se). This feature is effective particularly for the radiation detector using the amorphous semiconductor.

In another aspect of the invention, a radiation detector for detecting a spatial distribution of incident radiation, comprises a radiation-sensitive semiconductor; a common electrode formed on one surface of the semiconductor for receiving a bias voltage; a plurality of split electrodes formed on the other surface of the semiconductor for outputting, as electric signals, charges generated within the semiconductor by the incident radiation; a carrier selective intermediate layer formed at least between the semiconductor and the split electrodes; and a light irradiating mechanism for emitting light at least during a detection of the radiation.

The radiation detector having an intermediate layer as noted above produces effects similar to those of the first aspect of the invention.

Preferably, the light has a wavelength shorter than a wavelength that halves the transmittance of the intermediate layer. It is more desirable that the light has a wavelength shorter than a wavelength that reduces the transmittance of the intermediate layer to 10%.

Where the intermediate layer has more defects than the semiconductor layer and charges tend to collect in the intermediate layer, deflections of electric fields occur only in the intermediate layer. Thus, also where the intermediate layer is provided adjacent the split electrodes, the emission of light from the side of split electrodes to the intermediate layer eliminates sensitivity variations and after-output due to the charges collected in the regions of the intermediate layer between the split electrodes. With the light having a wavelength shorter than a wavelength that halves the transmittance of the intermediate layer, a large part of the irradiating light is absorbed by the intermediate layer, thereby reducing the irradiating light reaching the semiconductor. This provides the effect of suppressing dark current in the semiconductor due to the irradiating light, besides suppressing dark current by means of the intermediate layer.

Preferably, the semiconductor comprises an amorphous material selected from non-dope selenium or non-dope selenium compound, selenium or selenium compound doped with As or Te, selenium doped with an alkali metal, a selenium compound doped an alkali metal, selenium doped with a halogen, a selenium compound doped with a halogen, and selenium or selenium compound doped with a combination of As, Te, an alkali metal and a halogen. It is also preferable that the semiconductor comprises a polycrystalline material different from the intermediate layer and selected from compound semiconductors such as CdTe, CdZnTe, PbI2, HgI2, TlBr and GaAs, and the compound semiconductors doped with a halogen.

The intermediate layer is provided in order to reduce dark current by using its carrier selectivity. The carrier selectivity is a property for remarkably differentiating the contribution to the charge transfer function between electrons and holes acting as charge transfer media (carriers) within the semiconductor.

Materials having strong carrier selectivity for increasing the contribution of electrons are n-type semiconductors including, for example, polycrystals such as $CeO_2$, CdS, CdSe, ZnSe and ZnS, and amorphous materials such as amorphous selenium doped with As or Te or alkali metals to lower the contribution of holes.

Materials for increasing the contribution of holes are p-type semiconductors including polycrystals such as ZnTe, and amorphous materials such as amorphous selenium doped with halogen to lower the contribution of electrons.

Furthermore, $Sb_2S_3$, CdTe, CdZnTe, $PbI_2$ and $HgI_2$, TlBr, and non-dope amorphous selenium or selenium compound may increase the contribution of electrons or holes, depending on film-forming conditions.

Where both the intermediate layer and semiconductor layer are formed of amorphous materials, the following combinations can be considered, for example.

Where a positive bias is applied to the common electrode, an amorphous material with a large contribution of holes is used for the intermediate layer adjacent the split electrodes. This inhibits entry of electrons from the split electrodes to reduce dark current. In this case, an intermediate layer with a large contribution of electrons may also be provided adjacent the common electrode. This will inhibit entry of holes from the common electrode, thereby further reducing dark current.

Where a negative bias is applied to the common electrode, an amorphous material with a large contribution of electrons is used for the intermediate layer adjacent the split electrodes. This inhibits entry of holes from the split electrodes to reduce dark current. In this case, an intermediate layer with a large contribution of holes may also be provided adjacent the common electrode. This will inhibit entry of electrons from the common electrode, thereby further reducing dark current.

Where the semiconductor layer is an amorphous material and the intermediate layer a polycrystal, the following combinations are conceivable.

Where a positive bias is applied to the common electrode, a polycrystal with a large contribution of holes is used for the intermediate layer adjacent the split electrodes. Where a negative bias is applied to the common electrode, a polycrystal with a large contribution of electrons is used for the intermediate layer adjacent the split electrodes. In these cases, an intermediate layer may also be provided adjacent the common electrode for further reducing dark current.

Where both the intermediate layer and semiconductor layer are polycrystals, the following combinations can be considered, for example.

Where a positive bias is applied to the common electrode, a polycrystal with a large contribution of holes is used for the intermediate layer adjacent the split electrodes. Where a negative bias is applied to the common electrode, a polycrystal with a large contribution of electrons is used for the intermediate layer adjacent the split electrodes. In these cases, an intermediate layer may also be provided adjacent the common electrode for further reducing dark current.

Preferably, the intermediate layer is formed on the surface of the semiconductor having the split electrodes, by using a material having a threshold wavelength of transmittance between a wavelength that halves a transmittance and a wavelength corresponding to a band gap energy of the semiconductor.

The intermediate layer formed on the surface of the semiconductor having the split electrodes, by using a material having a threshold wavelength of transmittance between a wavelength that halves a transmittance and a wavelength corresponding to a band gap energy of the semiconductor, has a filtering effect to produce the above effects without limiting the wavelength of irradiating light.

Preferably, the split electrodes are transparent or translucent to the irradiating light.

Since the split electrodes are transparent or translucent, the light irradiates not only the regions of space between the split electrodes, but also electrode forming regions. Even when an incidence of radiation takes place at a higher rate than a charge sweep-out so that the charges once collect adjacent the split electrodes, the energy of the irradiating light excites the charges immediately again to give kinetic energy thereto. Consequently, the electric potential profile is not distorted, and no increase occurs with the potential adjacent the split electrodes. Thus, even with the a-Se film requiring application of a high bias voltage in use, the TFT switches can maintain a normal operation.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 1 shows schematic views illustrating a first problem of a conventional radiation detector, in which

FIG. 2 shows schematic views illustrating a second problem of a conventional radiation detector, in which

FIG. 3 is a view in vertical section showing an outline of a radiation detector according to this invention;

DESCRIPTION OF THE PREFERRED EMBODIMENTS

Preferred embodiments of this invention will be described in detail hereinafter with reference to the drawings.

Figure 1A:
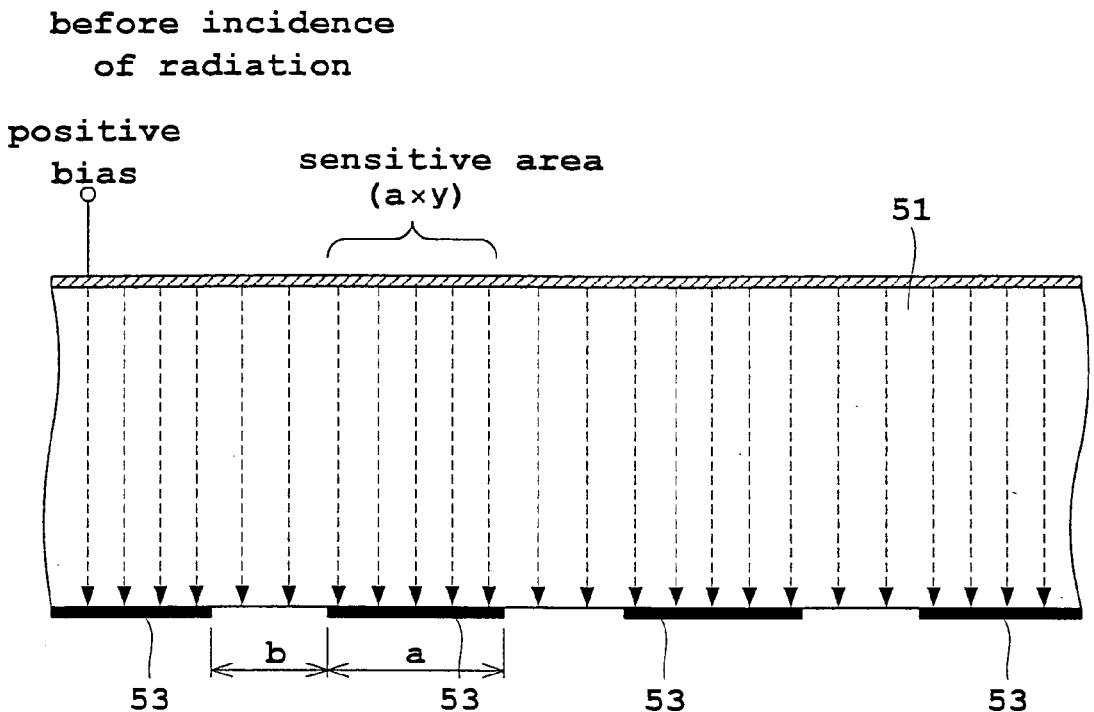
FIG. 1A shows a state before an incidence of radiation.
Figure 1B:
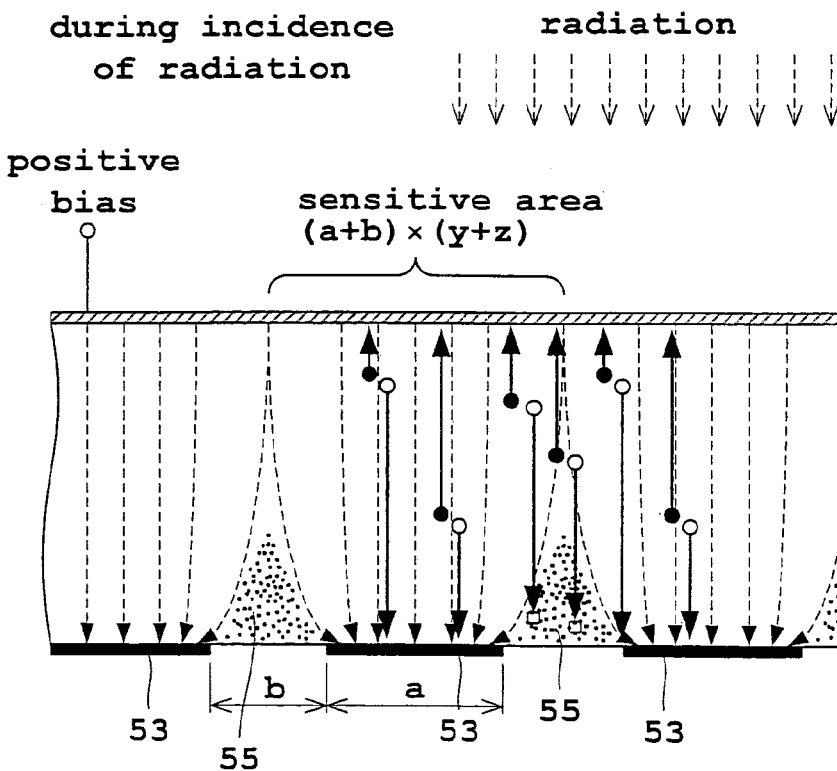
FIG. 1B shows a state during an incidence of radiation.
Figure 2A:
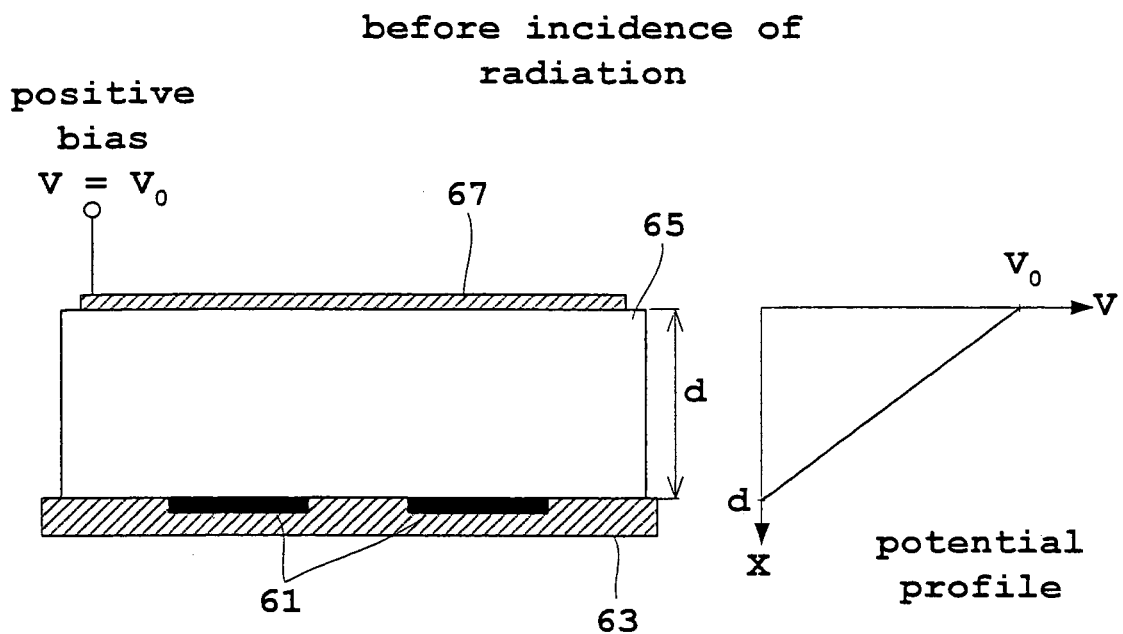
FIG. 2A shows a state before an incidence of radiation.
Figure 2B:
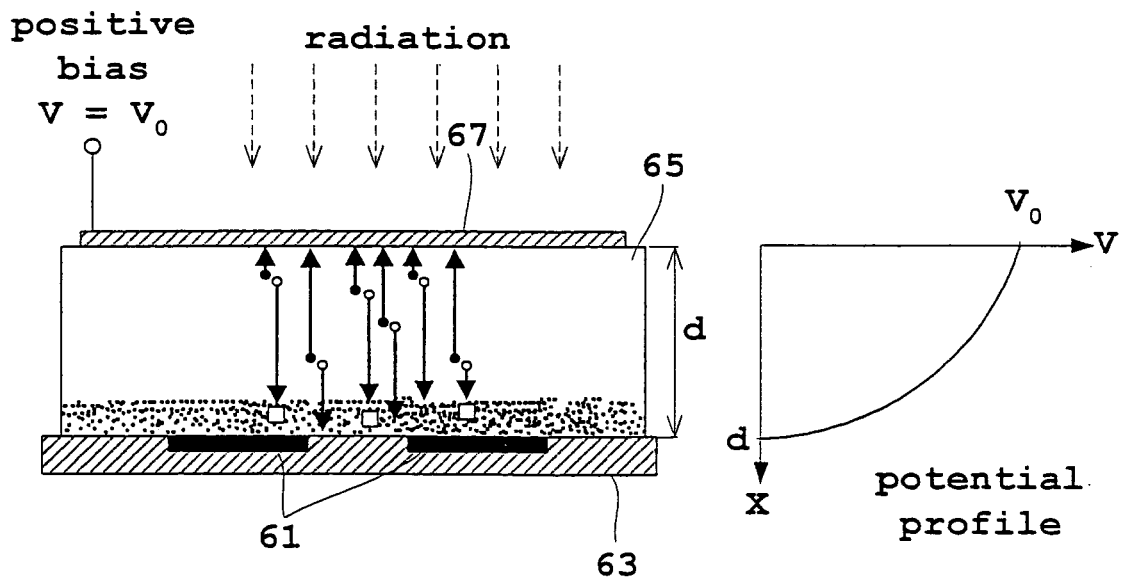
FIG. 2B shows a state during an incidence of radiation.
Figure 4:
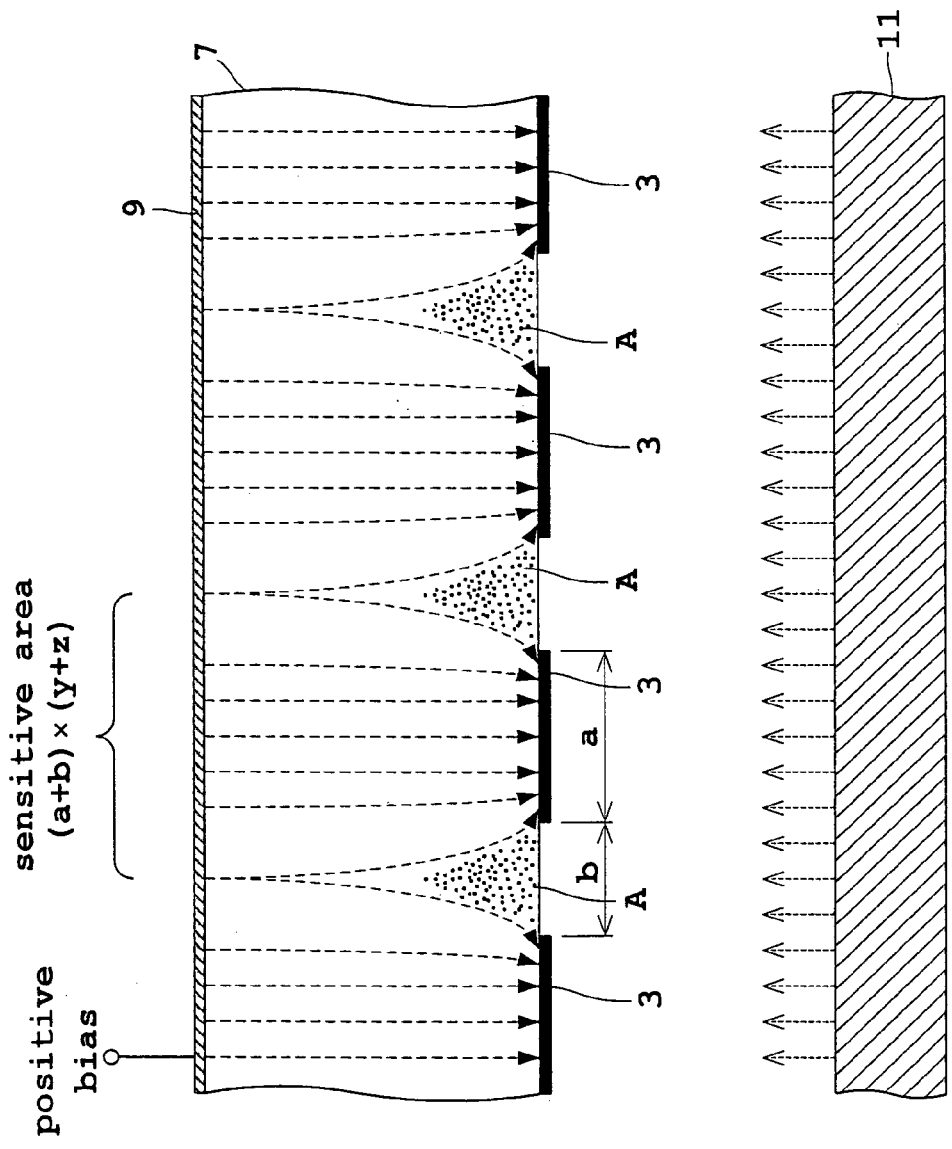
FIG. 4 is a schematic view showing a state before an incidence of radiation, for illustrating a first function of the radiation detector according to this invention.
Figure 5:
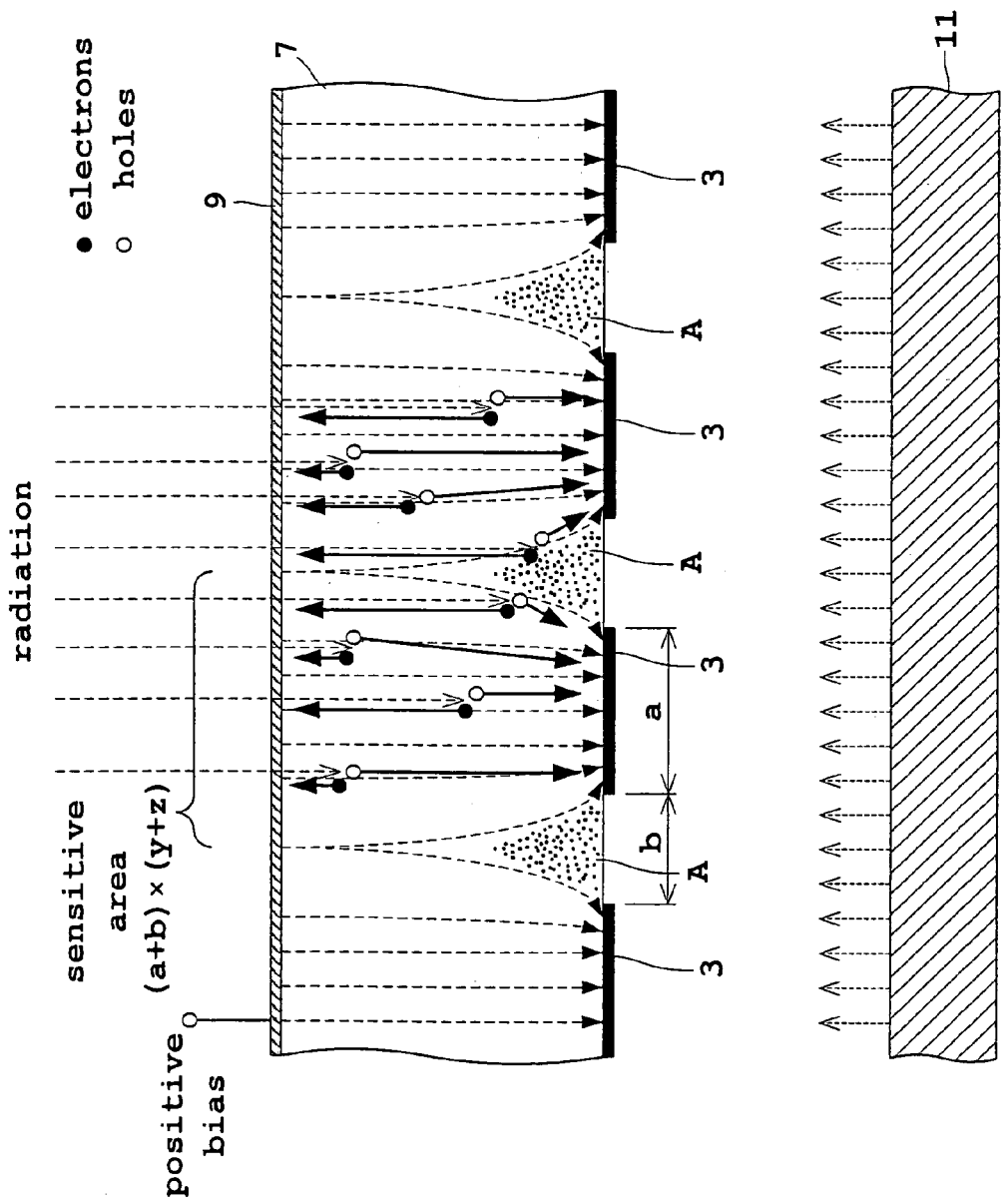
FIG. 5 is a schematic view showing a state during an incidence of radiation, for illustrating the first function of the radiation detector according to this invention.
Figure 6:
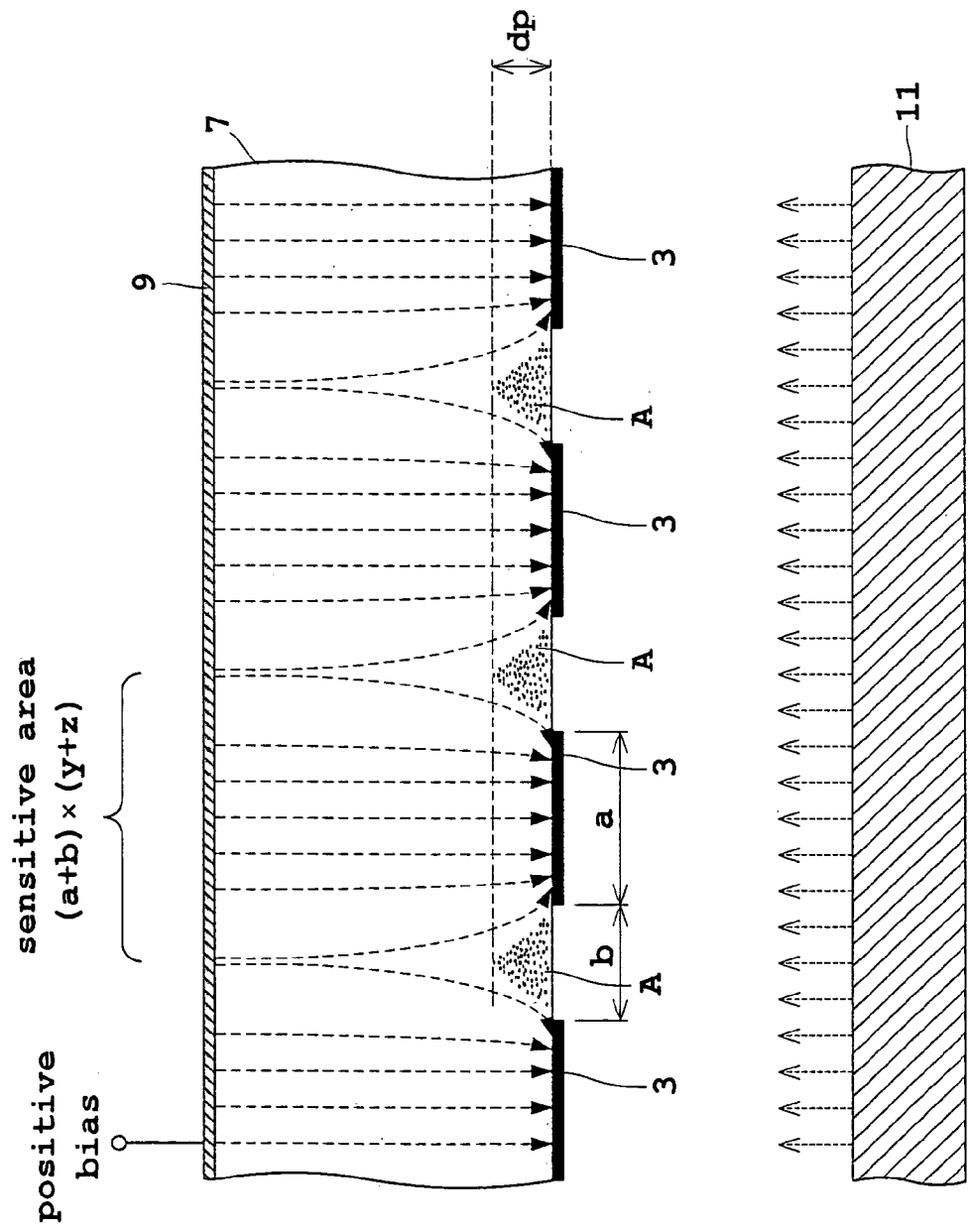
FIG. 6 is a schematic view showing a state during an irradiation with light having a wavelength shorter than a wavelength corresponding to a band gap, for illustrating the first function of the radiation detector according to this invention.
Figure 7:
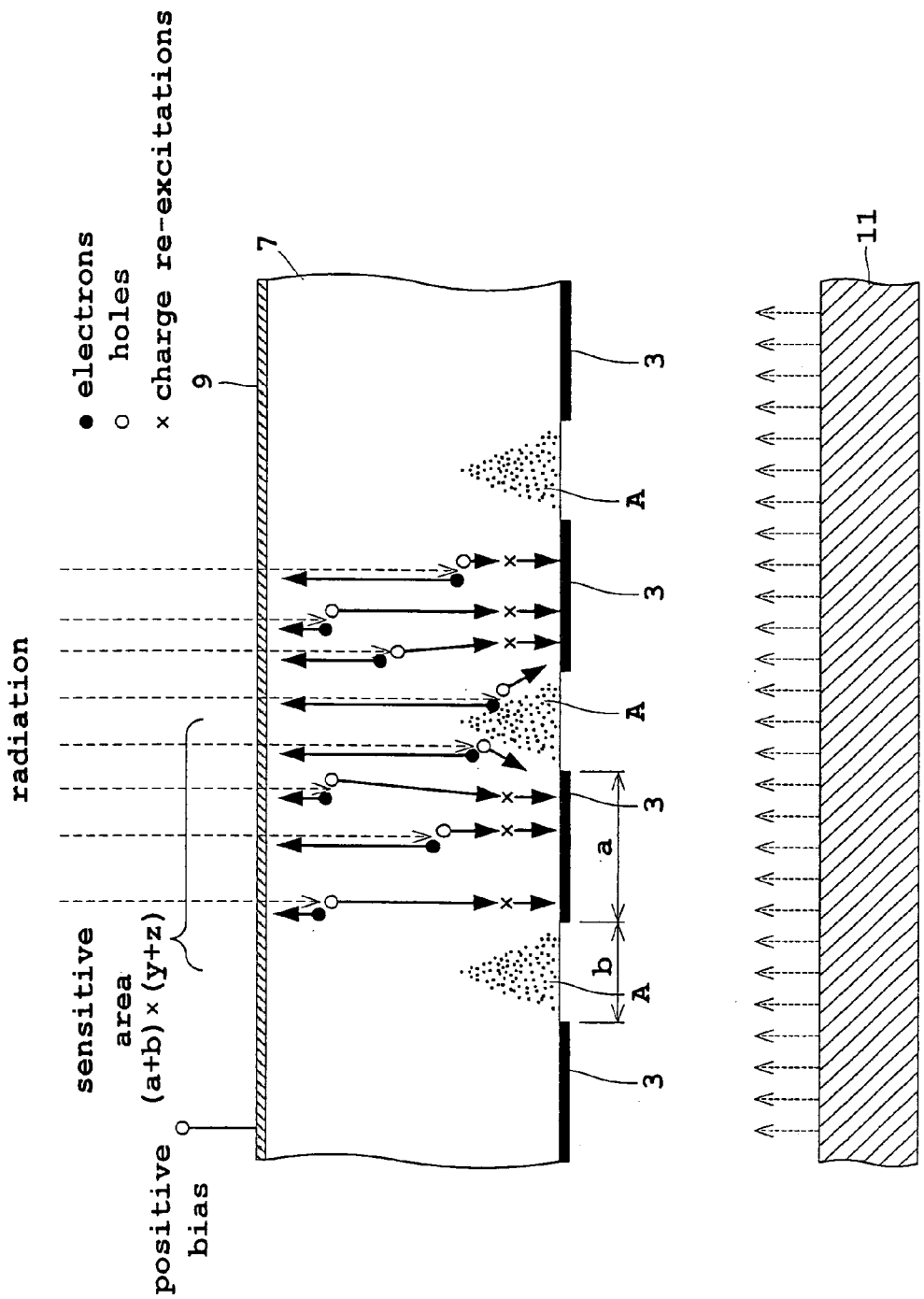
FIG. 7 is a view illustrating a second function of the radiation detector according to this invention.

A radiation detector according to this invention will be described with reference to FIGS. 3 through 7. FIG. 3 is a view in vertical section showing an outline of the radiation detector. FIG. 4 is a schematic view showing a state before an incidence of radiation, for illustrating a first function of the radiation detector. FIG. 5 is a schematic view showing a state during an incidence of radiation. FIG. 6 is a schematic view showing a state during an irradiation with light having a wavelength shorter than a wavelength corresponding to a band gap. FIG. 7 is a view illustrating a second function of the radiation detector.

As shown in FIG. 3, the radiation detector in this embodiment includes a TFT substrate 5 having thin film transistor (TFT) switches, charge storage capacitors and split electrodes 3 formed on a transparent insulating substrate such as a glass substrate. A thick semiconductor film 7 of amorphous selenium (a-Se) is formed on the TFT substrate 5, and a common electrode 9 for voltage application is formed on the upper surface of the thick a-Se semiconductor film 7. The TFT substrate 5 has a planar light emitting plate 11 attached by a transparent adhesive to the back surface thereof adjacent the split electrodes 3. The light emitting plate 11 has a green light emitting diode mounted therein and having a peak emission wavelength in the order of 570 nm. During a radiation detecting operation, this planar light emitting plate 11 can emit light uniformly through the TFT substrate 5 to the surface of the thick a-Se semiconductor film 7 adjacent the split electrodes 3. The above TFT substrate 5 and adhesive may be transparent only at the wavelength of the light emitted from the light emitting plate 11.

The irradiation by the light emitting plate 11 is continued at least while charges are read as electric signals by a signal processing circuit 13 and a gate driver 15.

The light emitting plate 11 corresponds to the light irradiating mechanism of this invention.

With the radiation detector constructed as described above, light is emitted from the light emitting plate 11 before an incidence of radiation. Thus, as shown in FIG. 4, charges generated by the light (i.e. holes where a positive bias is applied to the common electrode 9) are already collected in regions of space between the split electrodes 3 (as referenced A). Consequently, as indicated by dotted arrows in the thick semiconductor film 7, lines of electric force are distorted, and each sensitive area is (a+b)×(y+z) from the beginning.

When an incidence of radiation takes place in this state, as shown in FIG. 5, the charges (i.e. holes in the construction shown in FIG. 3) moving toward the split electrodes 3, of the charges (electrons and holes) generated in the regions of space between the split electrodes 3, follow the lines of electric force to reach the split electrodes 3. No additional charges will collect in the spaces between the split electrodes 3. Thus, no change occurs in the state of the lines of electric force or the sensitive areas, and hence no sensibility variations. The light emission from the light emitting plate 11 may be continued after cessation of the incidence of radiation. Then, the charges collected in the regions of space between the split electrodes 3 are not swept out gradually, and no after-output occurs.

The invention according to claim 2 or 3 may be implemented by selecting an emission wavelength of the light emitting diode elements in the light emitting plate 11.

Where, for example, an amorphous selenium (a-Se) film 1 mm thick is used as semiconductor, a transmittance halving wavelength is 740 nm and a wavelength corresponding to 2.2 eV band gap energy is 560 nm. Thus, a blue light emitting diode having a peak emission wavelength in the order of 450 nm may be used to emit light of a wavelength shorter than the wavelength corresponding to the 2.2 eV band gap energy.

Where the light emitted has a wavelength shorter than the wavelength corresponding to the band gap energy of the semiconductor used, as shown in FIG. 6, the irradiating light does not penetrate deep inside the semiconductor, but only reaches shallow positions (referenced dp in FIG. 6). Since action takes place only in portions very close to the surface forming the split electrodes 3, the charges generated by the light collect only in limited regions very close to the surface forming the split electrodes 3, thereby reducing insensitive regions.

The above planar light emitting plate 11 may be replaced with a cold cathode tube (25) and a phosphor as described hereinafter.

By using a yellow light emitting diode having a peak emission wavelength of about 590 nm or a red light emitting diode having a peak emission wavelength of about 630 nm, light may be emitted with a wavelength shorter than the transmittance halving wavelength, and longer than the wavelength corresponding to the band gap energy.

Where the wavelength of the irradiating light is shorter than the transmittance halving wavelength and longer than the wavelength corresponding to the band gap energy of the semiconductor used, part of the irradiating light penetrates deep into the semiconductor to enlarge insensitive regions. However, since the irradiating light has a smaller energy than the band gap energy, the semiconductor is free from damage (generation of crystal defects) done by the irradiating light. No increase occurs in the dark current resulting from a charge detection by the irradiating light itself. Damaging of the semiconductor by the irradiating light is conspicuous with the amorphous semiconductor such as amorphous selenium (a-Se). The construction set forth in claim 3 is effective particularly for the radiation detector using the amorphous semiconductor.

Where the split electrodes 3 are in the form of transparent or translucent electrodes such as ITO, the light irradiates not only the regions of space between the split electrodes 3, but also electrode forming regions (upper regions) through the split electrodes 3. Even when an incidence of radiation takes place at a higher rate than a charge sweep-out so that the charges once collect adjacent the split electrodes 3, as shown in FIG. 7, the energy of the irradiating light excites the charges immediately again to give kinetic energy thereto. Consequently, the electric potential profile is not distorted, and no increase occurs with the potential adjacent the split electrodes. Thus, even with the a-Se film requiring application of a high bias voltage in use, the TFT switches 8 can maintain a normal operation. The split electrode 3 may be transparent only to the wavelength of the irradiating light.

Examples of preferred materials for the thick semiconductor film 7 will be cited hereunder.

Amorphous materials include non-dope selenium or non-dope selenium compound, selenium or selenium compound doped with As or Te, selenium doped with an alkali metal such as Na, K or Li, a selenium compound doped an alkali metal, selenium doped with a halogen such as F or Cl, a selenium compound doped with a halogen such as F or Cl, and selenium or selenium compound doped with a combination of As, Te, an alkali metal such as Na, K or Li and a halogen such as F or Cl.

The above materials doped with impurities have an advantage of excellent transport characteristics such as carrier mobility. Further, the amorphous materials may be prevented from crystallizing at high temperatures to realize an enhanced resistance to environment.

Polycrystalline materials include compound semiconductors such as CdTe, CdZnTe, PbI$_2$, HgI$_2$, TlBr and GaAs, and the above compound semiconductors doped with a halogen such as F or Cl.

As shown in FIG. 3, the radiation detector may include an on/off switch 16A operable by a photographer or the like, and a power source 16B operable on an instruction from the on/off switch 16A to supply electric power to the planar light emitting plate 11 for emitting light. During a detection of radiation, a manual operation may be performed to emit light continuously or intermittently.

Further, the radiation detector may include a control unit 16C for automatically controlling light emission by operating an on/off switch (not shown) mounted in the power source 16B. In a control mode alternative to the control of the power source 16B, a shutter film may be operated for mechanically cutting off irradiating light, for example.

Figure 8:
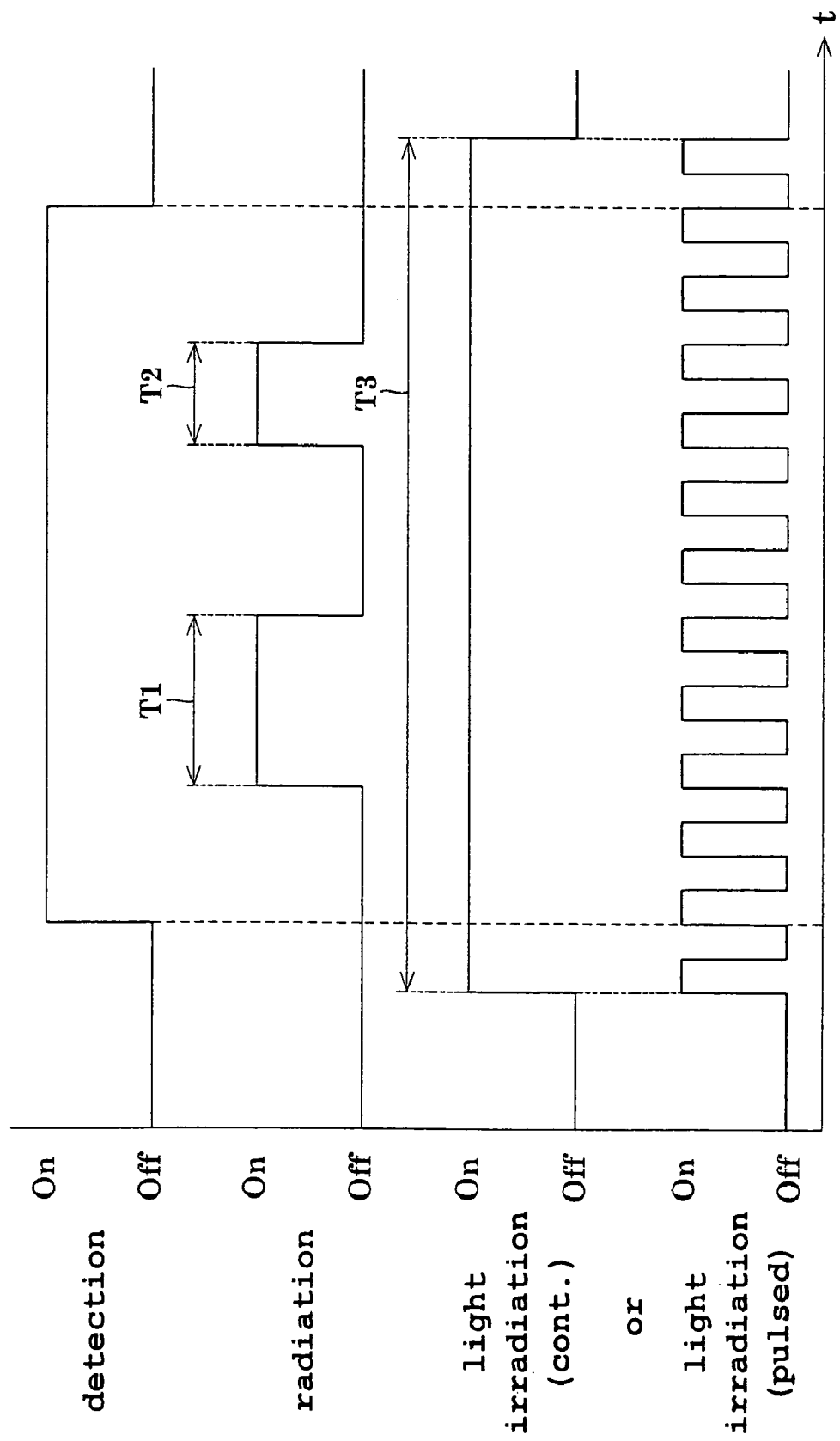
FIG. 8 is a timing chart showing an example of control of light irradiation during a detecting operation.
Figure 9:
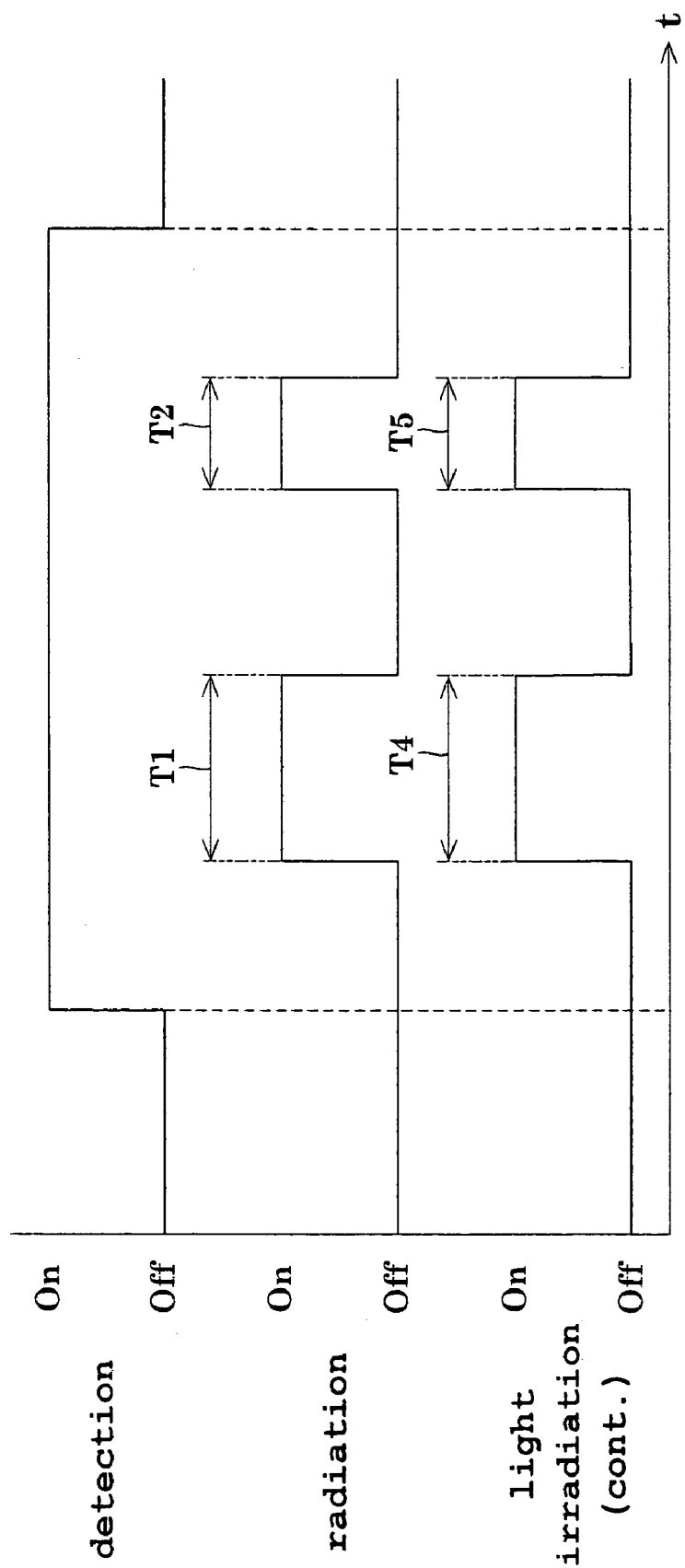
FIG. 9 is a timing chart showing another example of control of light irradiation during a detecting operation.
Figure 10:
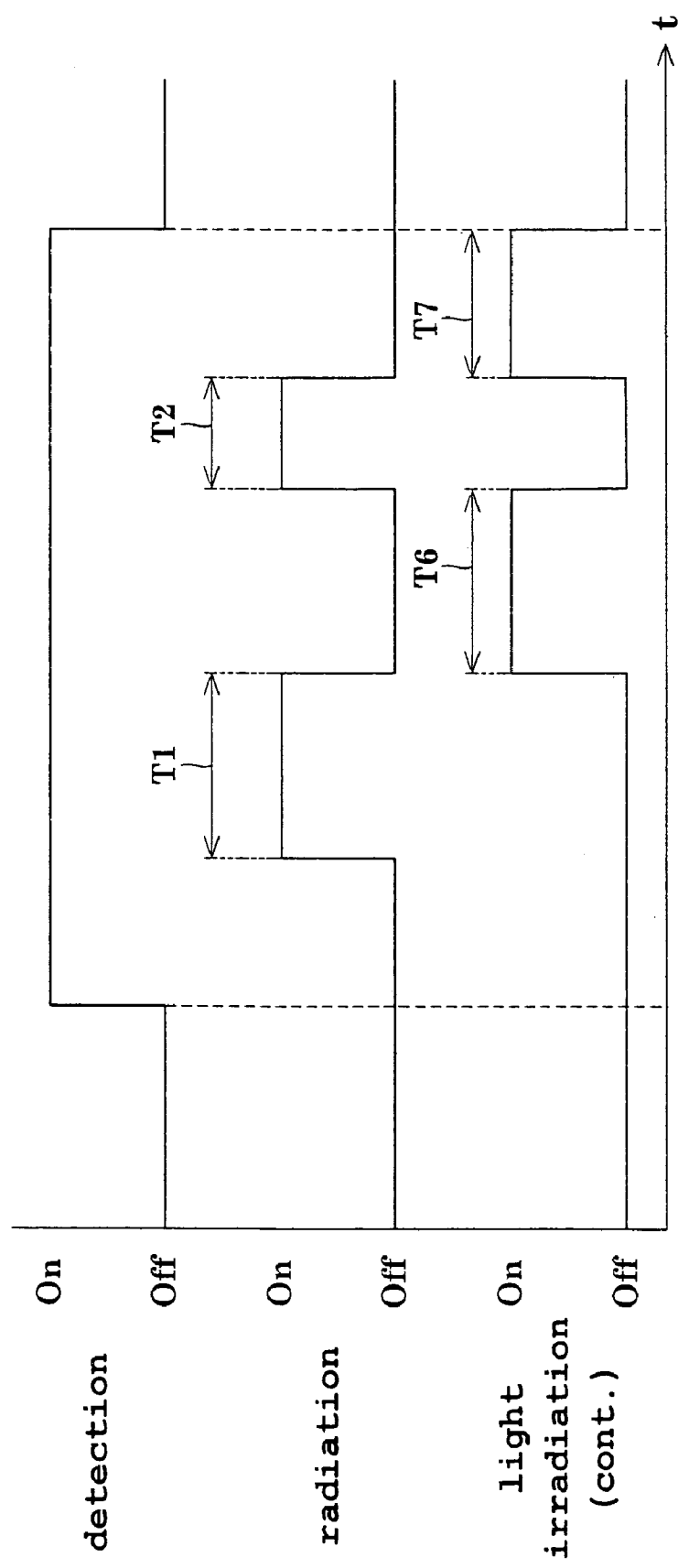
FIG. 10 is a timing chart showing a further example of control of light irradiation during a detecting operation.

Examples of light emission control by the control unit 16C will be described with reference to FIGS. 8 through 10. Three different control modes will be shown and described hereinafter. FIGS. 8 through 10 are timing charts showing examples of control of light irradiation during a detecting operation

FIG. 8 Refers.

In this example, while the control unit 16C performs a detecting operation through the signal processing circuit 13, radiation is emitted for two periods T1 and T2 in the meantime. During a period T3 including the detecting operation, the control unit 16C operates the on/off switch in the power source 16B to emit light continuously or intermittently. Particularly where light is emitted intermittently in a pulse shorter than a responsiveness of charge variations, an increase in dark current components by the light may be inhibited without spoiling the effect of charge collecting.

FIG. 9 Refers.

The control unit 16C emits radiation for two periods T1 and T2 during a detecting operation through the signal processing circuit 13. The control unit 16C turns on the on/off switch in the power source 16B only for periods T4 and T5 corresponding to the radiation emitting periods T1 and T2 during the detecting operation. With this light irradiation control, after-output cannot be reduced but sensibility variations can be reduced. Further, this control can inhibit an increase in dark current components by the light when no incidence of radiation takes place.

FIG. 10 Refers.

In this case, the control unit 16C emits radiation for two periods T1 and T2 during a detecting operation through the signal processing circuit 13. The control unit 16C turns on the on/off switch in the power source 16B only for periods T6 and T7 immediately following the radiation emitting periods T1 and T2 during the detecting operation. In other words, a control is made to emit light immediately after an incidence of radiation and until start of a next incidence. With this light irradiation control, sensibility variations cannot be reduced but after-output can be reduced. Further, this control can inhibit an increase in dark current components by the light during the incidences of radiation.

Figure 11:
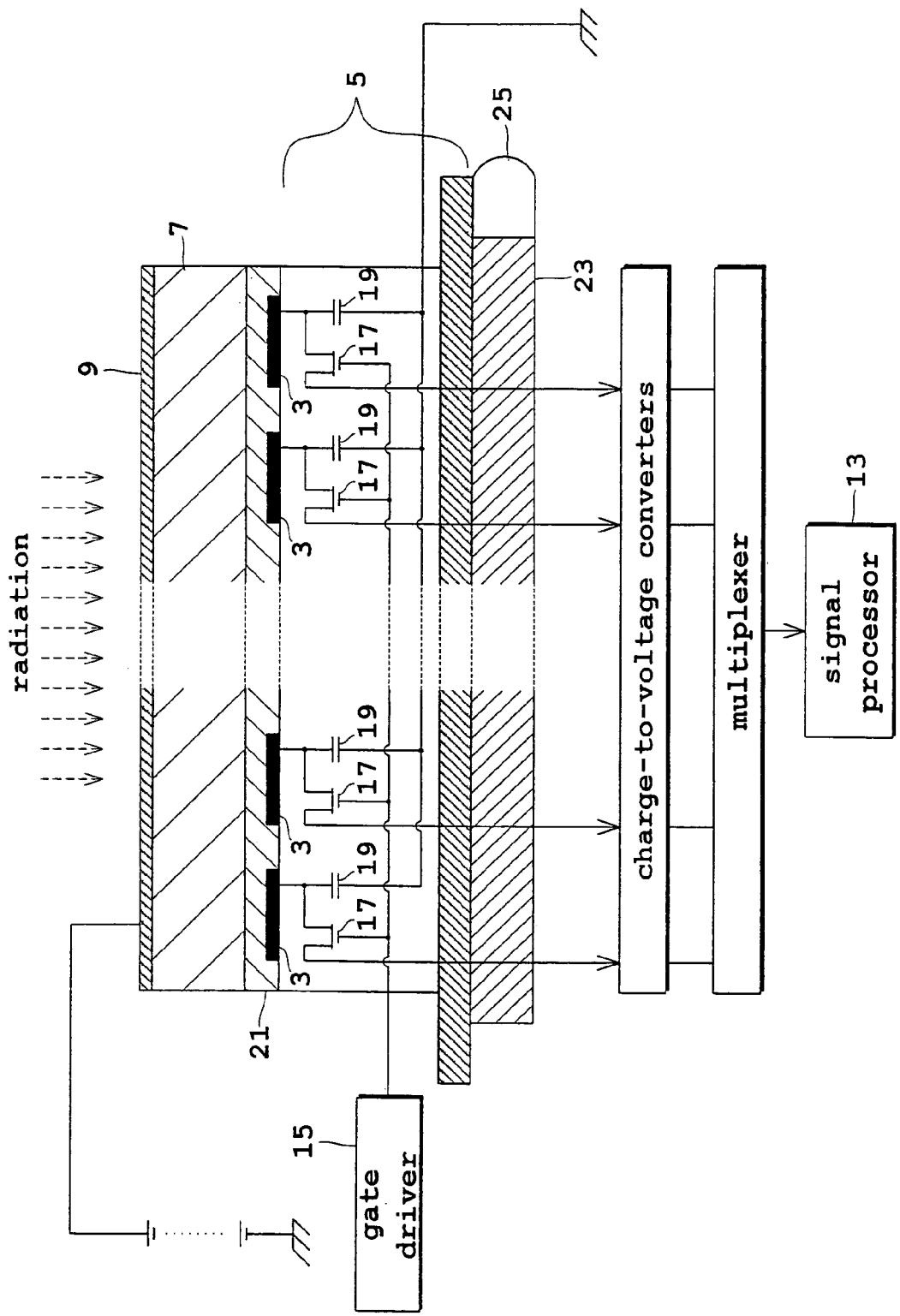
FIG. 11 is a view in vertical section showing an outline of an X-ray detector which is a modification of the embodiment according to this invention.

Next, a modification of the radiation detector in this embodiment will be described with reference to FIG. 11. FIG. 11 is a view in vertical section showing an outline of an X-ray detector serving as the modification.

As shown in FIG. 11, this X-ray detector includes a TFT substrate 5 having thin film transistor (TFT) switches 17, charge storage capacitors 19 and split electrodes 3 formed on a transparent insulating substrate such as a glass substrate. An intermediate layer 21, which is a thin film of antimony trisulfide (Sb$_2$S$_3$) with a thickness of 1 µm, is formed on the TFT substrate 5. A thick semiconductor film 7 of amorphous selenium (a-Se) is formed on the intermediate layer 21, and a common electrode 9 for voltage application is formed on the upper surface of the thick a-Se semiconductor film 7.

The intermediate layer 21 herein has carrier selectivity, and has an effect of inhibiting dark current. The carrier selectivity is a property for remarkably differentiating the contribution to the charge transfer function between electrons and holes acting as charge transfer media (carriers) within the semiconductor.

Materials for increasing the contribution of electrons are n-type semiconductors including, for example, polycrystals such as CeO$_2$, CdS, CdSe, ZnSe and ZnS, alkali metals, and amorphous materials such as amorphous selenium doped with As or Te or alkali metals to lower the contribution of holes. Materials for increasing the contribution of holes are p-type semiconductors including polycrystals such as ZnTe, and amorphous materials such as amorphous selenium doped with halogen to lower the contribution of electrons.

Furthermore, Sb$_2$S$_3$, CdTe, CdZnTe, PbI$_2$ and HgI$_2$, TlBr, and non-dope amorphous selenium or selenium compound may increase the contribution of electrons or holes, depending on film-forming conditions.

The TFT substrate 5 has a light guide plate 23 attached by a transparent adhesive to the back surface thereof adjacent the split electrodes 3. The light guide plate 23 is in the form of an acrylic plate having micromachined surfaces. A cold cathode tube 25 is attached to an end surface of the light guide plate 23 to act as a white light source. The light guide plate 23 and cold cathode tube 25, which correspond to the light irradiating mechanism and planar light emitting means of this invention, can, during a radiation detecting operation, emit light uniformly through the TFT substrate 5 to the surface of a-Se thick semiconductor film 7 adjacent the split electrodes 3 where the intermediate layer 21 is formed. The cold cathode tube 25 corresponds also to the linear light emitting means of this invention.

Figure 12:
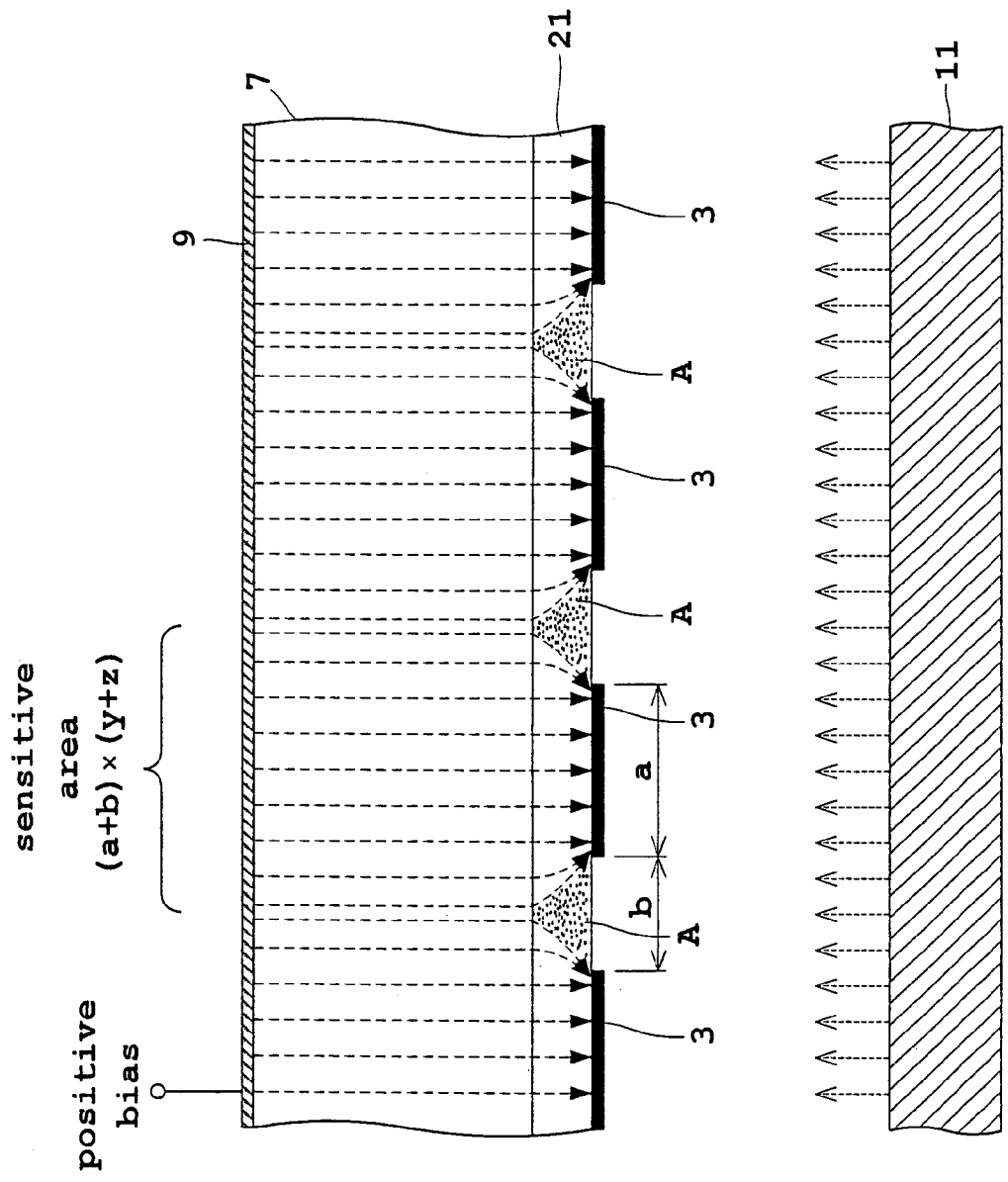
FIG. 12 is an explanatory view showing that an intermediate layer has more defects than a thick semiconductor film, and tends to collect charges therein.

Where, as shown in the schematic view of FIG. 12, the intermediate layer 21 has more defects than the thick semiconductor film 7 and charges A tend to collect in the intermediate layer 21, deflections of electric fields occur only in the intermediate layer 21. Thus, also where the intermediate layer 21 is provided adjacent the split electrodes 3, the emission of light from the side of split electrodes 3 to the intermediate layer 21 eliminates sensitivity variations and after-output due to the charges collected in the regions of the intermediate layer 21 between the split electrodes 3.

An indirect light emitting device may be formed by combining the above cold cathode tube 25 and a phosphor that emits light of a preferred particular wavelength as described hereinafter. In this case, the cold cathode tube 25 (field emission tube) may be replaced with an incandescent tube or gas discharge tube. The gas discharge tube may be a plasma display panel (PDP) or field emission display panel (FEDP), for example.

Figure 13:
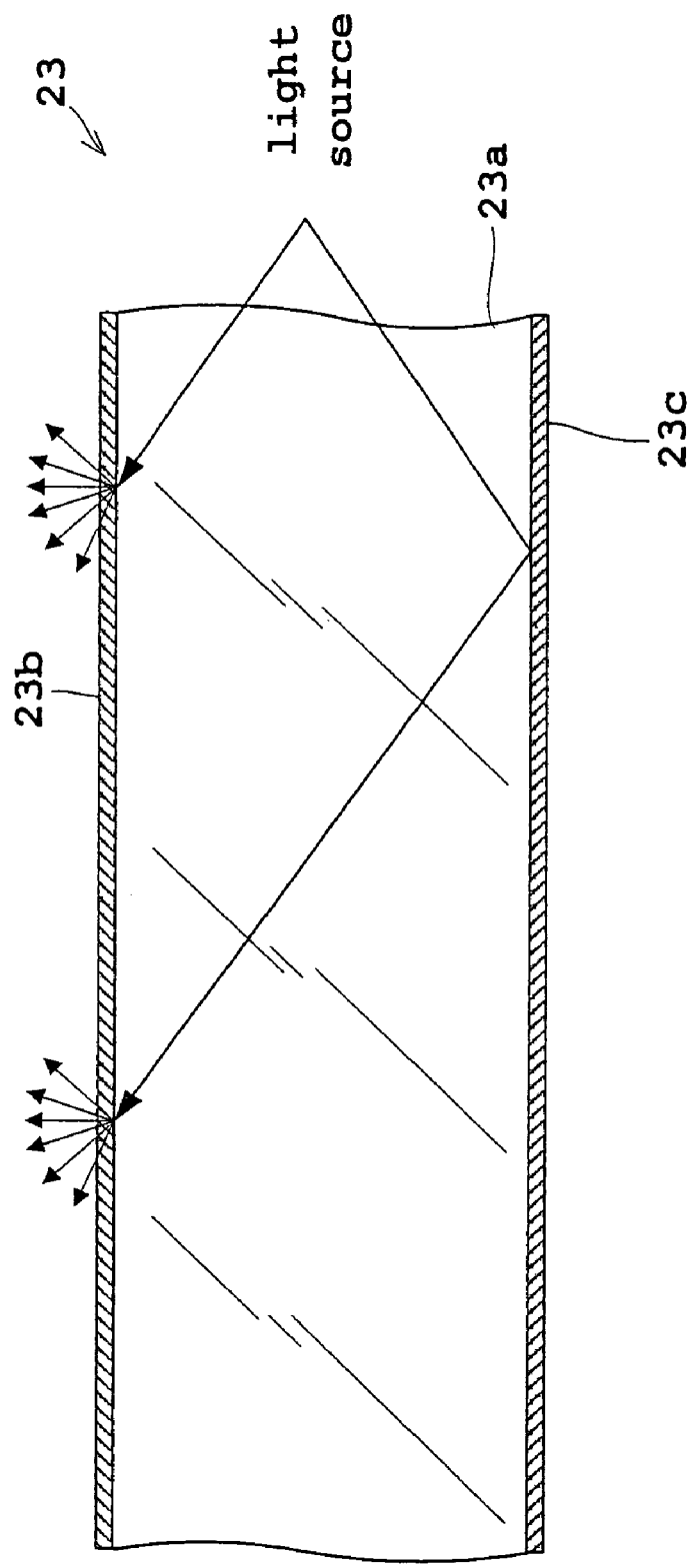
FIG. 13 is a partly enlarged view in vertical section showing an example of light guide plate.

The above light guide plate 23 may be constructed as set out below. FIG. 13 is a partly enlarged view in vertical section showing an example of construction of the light guide plate.

The light guide plate 23 includes, for example, a transparent plate 23a having micromachined surfaces, a light diffusing sheet 23b and a light reflecting sheet 23c. The light diffusing sheet 23b is applied to the surface of transparent plate 23a opposed to the split electrodes 3, while the light reflecting sheet 23c is applied to the other surface of transparent plate 23a. The transparent plate 23a may be a glass plate or acrylic plate, for example.

With this construction, the light reflecting sheet 23c reflects the light from the light source to the transparent plate 23a to promote use efficiency of the light. In addition, the light diffusing sheet 23b diffuses the light to uniform the light emission.

A large part of irradiating light may be emitted only to the intermediate layer 21 by using a wavelength shorter than a wavelength that halves the transmittance of the intermediate layer 21. Based on the results of experiment described below, the light may be directed more concentratedly to the intermediate layer 21 by using a wavelength shorter than a wavelength that reduces the transmittance of the intermediate layer 21 to 10%. In other words, the light may be prevented from reaching the thick semiconductor film 7. This eliminates adverse influences of an increase in dark current in the thick semiconductor film 7 due to the light irradiation.

Figure 14:
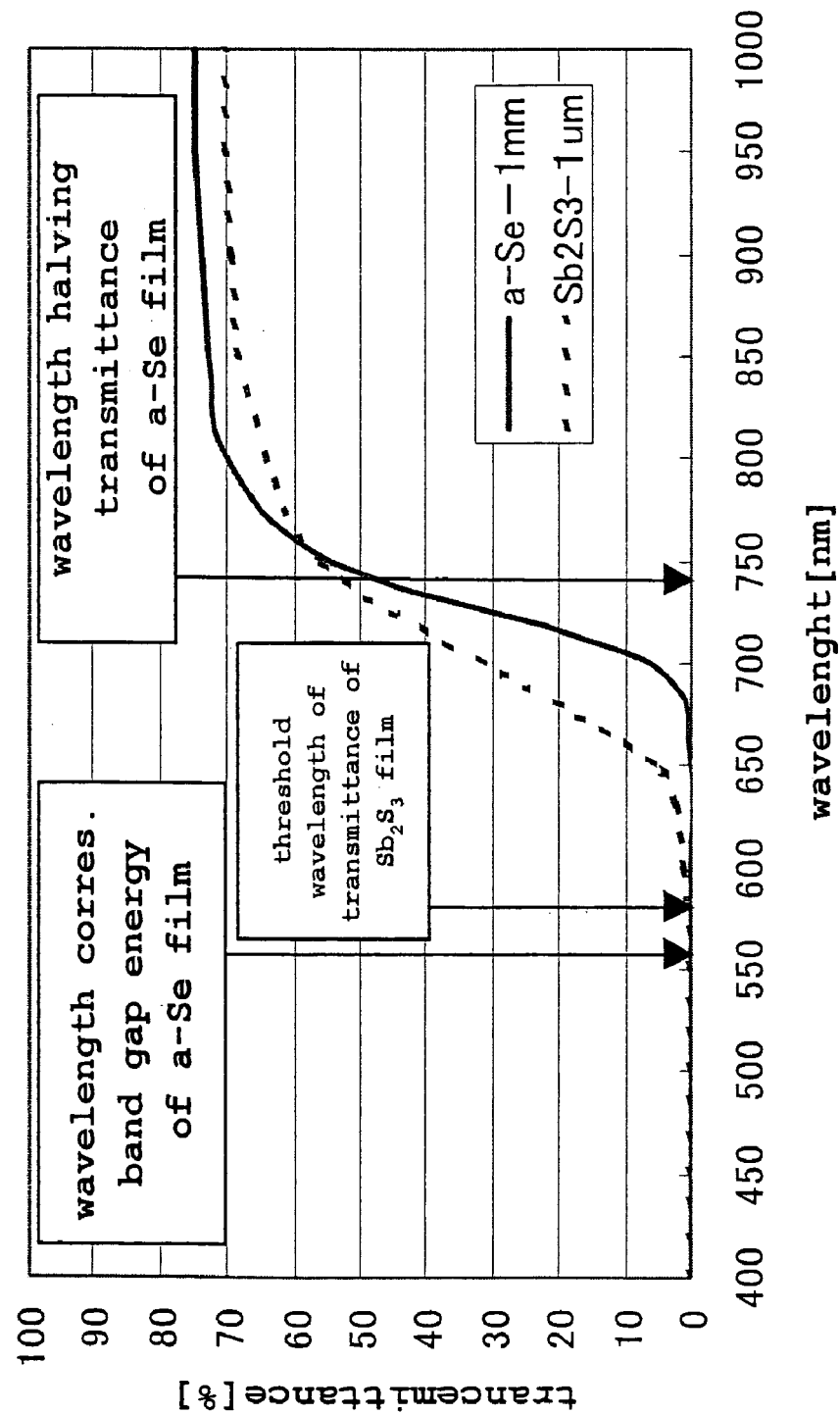
FIG. 14 is a graph showing transmittances of a-Se and $Sb_2S_3$ thin films.

The wavelength that reduces the transmittance of the intermediate layer 21 to 10% is a wavelength of about 710 nm as seen from FIG. 14, where amorphous selenium (a-Se) is used as the intermediate layer 21. This wavelength is about 660 nm where antimony trisulfide ($Sb_2S_3$) film is used as the intermediate layer 21.

Figure 15:
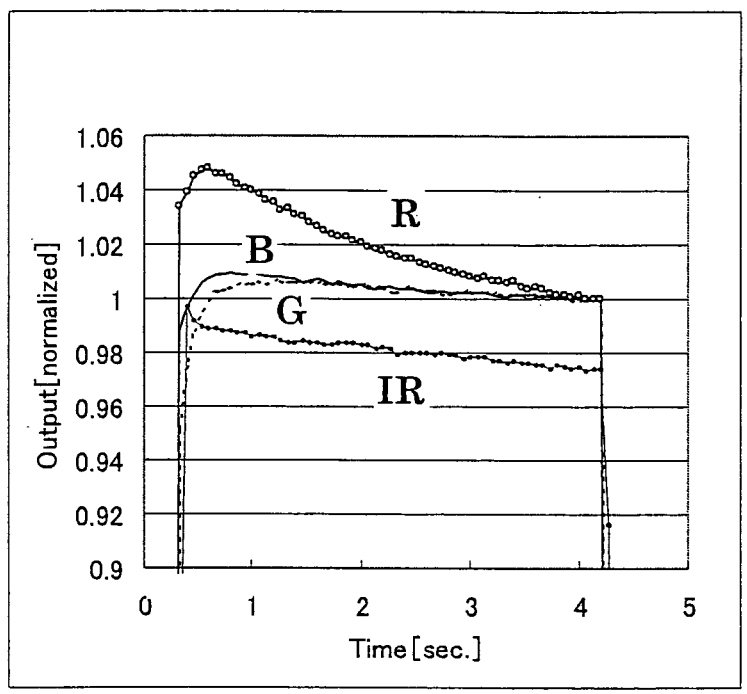
FIG. 15 is a graph showing, in enlargement, a rise portion of response characteristics in time of irradiation with lights of various wavelengths.
Figure 16:
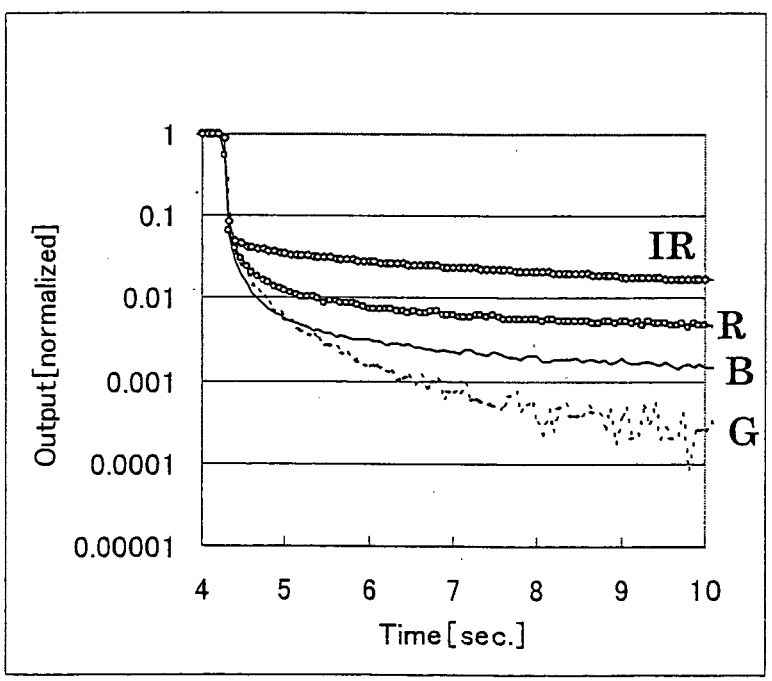
FIG. 16 is a graph showing, in enlargement, a fall portion of the response characteristics in time of irradiation with the lights of various wavelengths.

The basis for preferring the above wavelength will be described with reference to FIGS. 15 and 16. FIG. 15 is a graph showing, in enlargement, a rise portion of response characteristics in time of irradiation with lights of various wavelengths. FIG. 16 is a graph showing, in enlargement, a fall portion of the response characteristics in time of irradiation with the lights of various wavelengths.

These response characteristics were measured using planar light emitting diodes of wavelengths other than green and an infrared light source, and with the same conditions as in the embodiment described hereinafter (with an intermediate layer 21 of $Sb_2S_3$ film with a thickness of 1 μm). The specifications of the light emitting diodes and infrared light source used in the experiment are as follows:

blue . . . central wavelength of 450 nm (400 to 530 nm)
    green . . . central wavelength of 570 nm (460 to 650 nm)
    red . . . central wavelength of 630 nm (590 to 720 nm)
    infrared light source . . . halogen lamp+short wavelength cut filter SC 70 with an emission wavelength of at least 700 nm As seen from the two graphs, the red light (referenced R in the drawings) shows low effects of reducing sensitivity variations and residual charges. Furthermore, for infrared light (referenced IR in the drawings), there is not only almost no effect of reducing residual charges, but a side effect of causing sensitivity to fall off at a rise time appears. This shows that a light of a long wavelength transmitted through the intermediate layer 21 not only fails to improve the situation but even has adverse influences. Thus, where the intermediate layer 21 is formed of antimony trisulfide ($Sb_2S_3$) at least, it is preferable to emit light of a wavelength shorter than 740 nm which is a transmittance halving wavelength.

The blue light (referenced B in the drawings) and green light (referenced G in the drawings) with shorter wavelengths than the red light show outstanding effects of reducing sensitivity variations and residual charges. Thus, a light of short wavelength not transmitted through the intermediate layer 21 is preferable. These results show that, at least where the intermediate layer 21 is antimony trisulfide ($Sb_2S_3$), preferred light has a wavelength shorter than the wavelength (660 nm) which reduces transmittance to 10%.

The radiation detector in this embodiment and its modification apply a bias voltage to the common electrode 9, and operate while the irradiating light is emitted. Charges (electrons and holes) generated in the thick semiconductor film 7 by incident radiation move toward the opposite electrodes. Charges induced by the movement of the charges (electrons and holes) are once stored in the charge storage capacitors 19 on the TFT substrate 5 connected through the split electrodes 3. At reading times controlled from outside, a gate driver 15 sends ON signals to turn on (connect) the thin film transistor (TFT) switches 17. Then, the stored charges are successively outputted as radiation detection signals to the signal processing circuit 13 connected to the outside, thereby obtaining a two-dimensional image of the radiation.

Examples of materials suited for the above intermediate layer 21 will be cited hereunder. The materials suited for the thick semiconductor film 7 are shown hereinbefore.

Amorphous materials include non-dope selenium or non-dope selenium compound, selenium or selenium compound doped with As or Te, selenium doped with an alkali metal such as Na, K or Li, selenium compound doped with an alkali metal, selenium doped with a halogen such as F or Cl, selenium compound doped with a halogen such as F or Cl, and selenium or selenium compound doped with a combination of an alkali metal such as As, Te, Na, K or Li, and a halogen such as F or Cl.

However, in order to operate the intermediate layer 21, the thick semiconductor film 7 should be formed of a material different from a material for the intermediate layer 21. Or the intermediate layer 21 should be formed of a material different from a material for the thick semiconductor film 7.

Specifically, where both the intermediate layer 21 and thick semiconductor film 7 are formed of amorphous materials, the following combinations can be considered, for example.

Where a positive bias is applied to the common electrode 9, an amorphous material with a large contribution of holes is used for the intermediate layer 21 adjacent the split electrodes 3. This inhibits entry of electrons from the split electrodes 3 to reduce dark current. In this case, an intermediate layer 21 with a large contribution of electrons may also be provided adjacent the common electrode 9. This will inhibit entry of holes from the common electrode 9, thereby further reducing dark current.

Where a negative bias is applied to the common electrode 9, an amorphous material with a large contribution of electrons is used for the intermediate layer 21 adjacent the split electrodes 3. This inhibits entry of holes from the split electrodes 3 to reduce dark current. In this case, an intermediate layer 21 with a large contribution of holes may also be provided adjacent the common electrode 9. This will inhibit entry of electrons from the common electrode 9, thereby further reducing dark current.

Where the thick semiconductor film 7 is an amorphous material and the intermediate layer 21 a polycrystal, the following combinations are conceivable.

Where a positive bias is applied to the common electrode 9, a polycrystal with a large contribution of holes is used for the intermediate layer 21 adjacent the split electrodes 3. Where a negative bias is applied to the common electrode 9, a polycrystal with a large contribution of electrons is used for the intermediate layer 21 adjacent the split electrodes 3. In these cases, an intermediate layer 21 may also be provided adjacent the common electrode 9 for further reducing dark current.

Where both the intermediate layer 21 and thick semiconductor film 7 are polycrystals, the following combinations can be considered, for example.

Where a positive bias is applied to the common electrode 9, a polycrystal with a large contribution of holes is used for the intermediate layer 21 adjacent the split electrodes 3. Where a negative bias is applied to the common electrode 9, a polycrystal with a large contribution of electrons is used for the intermediate layer 21 adjacent the split electrodes 3. In these cases, an intermediate layer 21 may also be provided adjacent the common electrode 9 for further reducing dark current.

Polycrystalline materials suited for the intermediate layer 21 include compound semiconductors of $Sb_2S_3$, $CeO_2$, CdS, CdSe, CdTe, CdZnTe, ZnSe, ZnTe, ZnS, $PbI_2$, $HgI_2$, TlBr and GaAs, these compound semiconductors doped with a halogen such as F or Cl, and a combination of these polycrystals forming multiple layers.

The indirect light emitting device may be replaced with a direct light emitting device for directly emitting light of a particular wavelength. Such direct light emitting device may be a light emitting diode, laser diode (LD) or electroluminescent device (EL).

Figure 17:
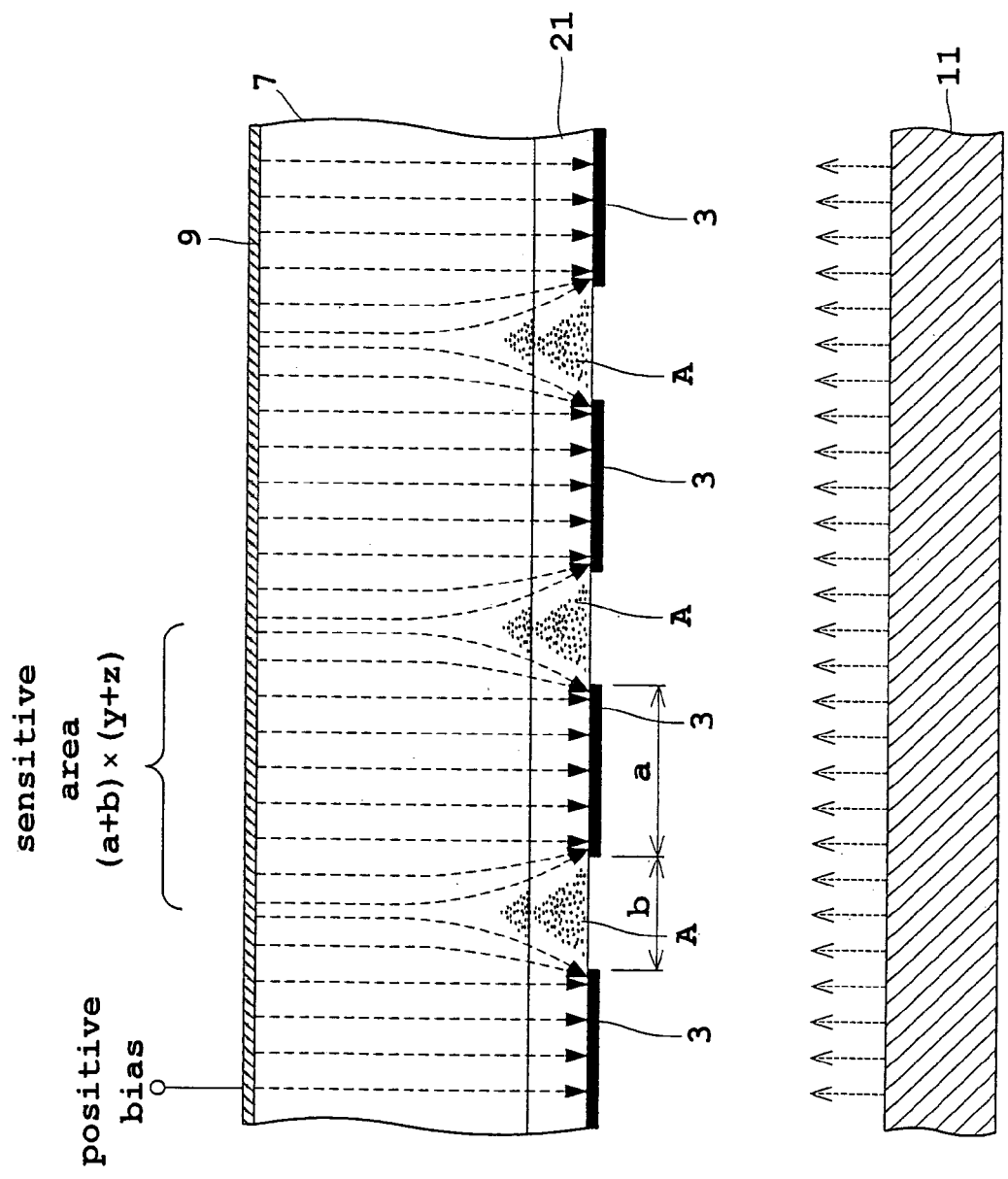
FIG. 17 is an explanatory view showing charges collecting in both the thick semiconductor film and intermediate layer.

In this case, instead of the cold cathode tube 25, the above direct light emitting device may be arranged linearly to act as a linear light emitter, or may be arranged in a plane for use as the planer light emitting means of this invention. Furthermore, these direct light emitting devices may be formed directly on the TFT substrate 5 by double-sided device technique. This will realize a thin and compact mechanism relating to light irradiation.

Where the intermediate layer 21 is provided, as shown in the schematic view of FIG. 17, charges may collect in both the thick semiconductor film 7 and intermediate layer 21. It is therefore necessary to emit light to both. By appropriately selecting materials for the thick semiconductor film 7 and intermediate layer 21 to produce a filtering effect to allow light to reach a desired depth. That is, of the wavelength components of white light, short wavelength components are absorbed by the intermediate layer 21, and do not reach deep into the thick semiconductor film 7. Thus, a large part of the light may act on the intermediate layer 21 without causing damage due to irradiation and an increase in dark current. Long wavelength components are transmitted through the intermediate layer 21 to reach and act on the thick semiconductor film 7.

Where, for example, 1 mm thick amorphous selenium (a-Se) is used as the thick semiconductor film 7, as shown in FIG. 14, the transmittance halving wavelength is 740 nm, and the wavelength corresponding to band gap energy 2.2 eV is 560 nm. Thus, the intermediate layer 21 may be formed by using a material having a threshold wavelength of transmittance of 560 nm to 740 nm. FIG. 14 is a graph showing transmittances of a-Se and $Sb_2S_3$ films.

Since the transmittance threshold wavelength of antimony trisulfide ($Sb_2S_3$) film with a thickness of 1 μm is 580 nm, the antimony trisulfide ($Sb_2S_3$) film with a thickness of 1 μm may be formed between amorphous selenium and the split electrodes 3. Then, the short wavelength components of 580 nm or less of the white light emerging from the cold cathode tube 25 are cut, whereby the energy of irradiating light becomes smaller than the band gap energy to avoid damage to the semiconductor by the irradiating light and an increase in dark current. It is necessary to select a material and thickness of the intermediate layer 21 according to the material used for the thick semiconductor film 7. However, it becomes unnecessary to limit the wavelength of irradiating light, thereby providing an effect of simplifying the construction relating to light irradiation. In other words, even where a white light source instead of a monochromatic light source is used as the irradiating light source, the radiation detector is free from sensitivity variations without causing damage due to irradiation and an increase in dark current.

The intermediate layer 21 may be disposed directly under the common electrode 9 instead of being directly over the split electrodes 3 as in the foregoing example. The effects similar to those of the above construction may be produced by forming intermediate layers 21 directly under the common electrode 9 as well as directly over the split electrodes 3. In this case, the two intermediate layers 21 need not be formed of the same material.

"Implementation"

To confirm that the radiation detector in this embodiment actually inhibits sensitivity variations, a testing detector was fabricated as follows. The intermediate layer 21 of $Sb_2S_3$ film was formed with a thickness of 1 μm on the TFT substrate 5 with the split electrodes 3 formed of ITO, which is a typical material for transparent electrodes, with an electrode size of a=130 μm and an electrode pitch of a+b=150 μm. The a-Se semiconductor layer 7 was formed with a thickness of 1 mm on the intermediate layer 21, and then the common electrode 9 of Au film was formed with a thickness of 0.1 μm. A planar green light emitting diode is attached to the back surface of the TFT substrate 5 by a transparent adhesive. By using this testing detector, a comparison was made regarding the extents of sensitivity variation and after-image phenomena in time of emission and non-emission from the light emitting diode.

Figure 18:
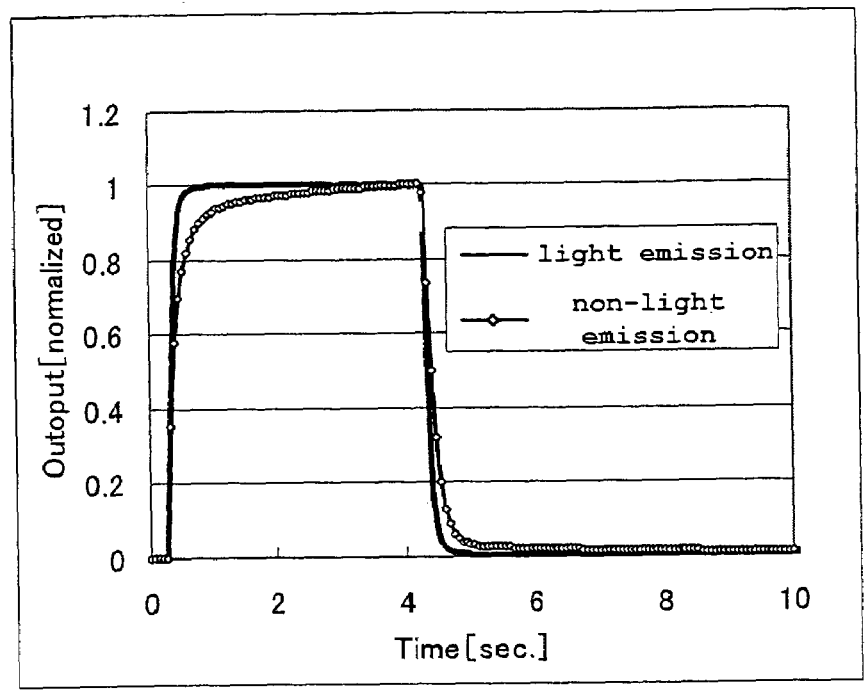
FIG. 18 is a graph for comparing characteristics of a testing X-ray detector according to the invention.

FIG. 18 shows output variations in time of emitting X-rays from an X-ray tube to the testing detector for four seconds with conditions of 55 kV tube voltage, 25 mA tube current, and 1 m distance. It will be seen that, when the light emitting diode emits no light, the detector is slow in response, and its output increases gradually, that is its sensitivity varies. When the light emitting diode emits light, the output rises almost instantly and remains constant during the X-ray irradiation. In time of non-emission from the light emitting diode, the output fails to exhibit a sharp stop upon cessation of the X-ray radiation, with a residual output continuing for one second or more.

Figure 19:
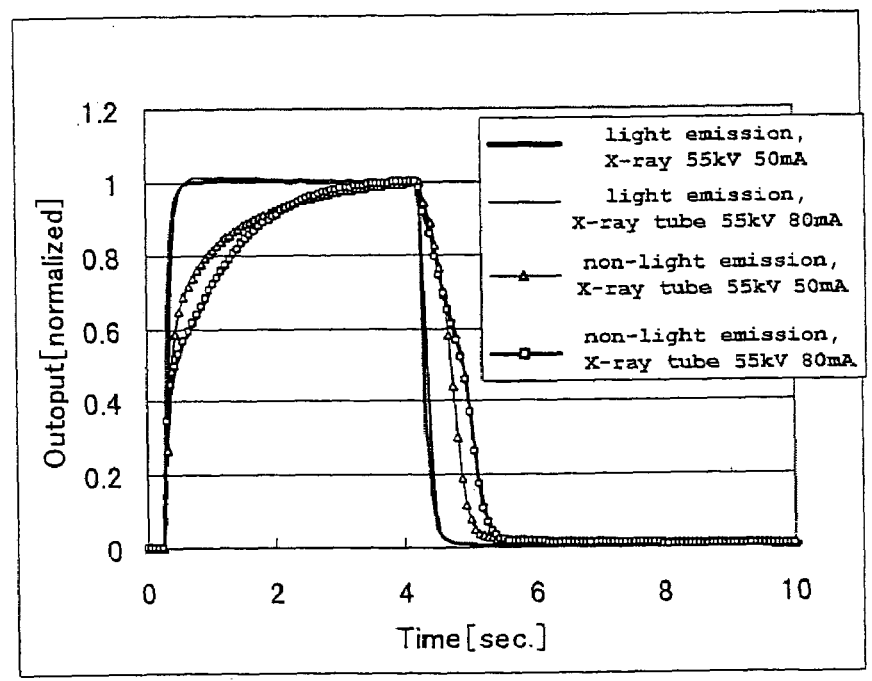
FIG. 19 is another graph for comparing characteristics of the testing X-ray detector according to the invention.

Next, FIG. 19 shows output variations in time of emitting X-rays in an increased dose from the X-ray tube with the same 55 kV tube voltage and the tube current raised to a range of 50 mA to 80 mA. When the light emitting diode emits no light, the detector shows a still slower response, and its output varies far in excess of the value accounted for by the electrode size and electrode intervals. Further, peculiar residual curves appear after cessation of the X-ray radiation, which suggests malfunctioning of the TFT switches 17. However, this phenomenon does not occur when the light emitting diode emits light. The output rises almost instantly and remains constant during the X-ray irradiation. Almost no residual output occurs after cessation of the X-ray irradiation.

This invention is not limited to the foregoing embodiments, but may be modified as follows:

(1) In the foregoing embodiments, the light irradiating mechanism is attached to a lower position of the radiation detector. Where the split electrodes 3 of the radiation detector are located in an upper position, the light irradiating mechanism may be attached to the upper position of the radiation detector.

(2) The light irradiating mechanism in this invention may comprise a combination of a planer light emitting plate or a cold cathode tube and a power source, a combination of a cold cathode tube, a phosphor and a power source, a combination of these and a manual switch, a combination of these and a control unit, or in any other form that emits light.

This invention may be embodied in other specific forms without departing from the spirit or essential attributes thereof and, accordingly, reference should be made to the appended claims, rather than to the foregoing specification, as indicating the scope of the invention.

What is claimed is:

1. A radiation detector for detecting a spatial distribution of incident radiation, comprising:
   a radiation-sensitive semiconductor;
   a common electrode formed on one surface of said semiconductor for receiving a bias voltage;
   a plurality of split electrodes formed on the other surface of said semiconductor for outputting, as electric signals, charges generated within said semiconductor by the incident radiation; and
   a light irradiating mechanism for emitting light at least during a detection of the incident radiation, the emitted light having a wavelength sufficient to cause charges generated by the emitted light in said semiconductor to collect in areas between the plurality of split electrodes and to distort lines of electric force and suppress chance in the distorted lines of electric force during the emission of light from said light irradiating mechanism.

2. A radiation detector as defined in claim 1, wherein said semiconductor comprises an amorphous material selected from non-dope selenium or non-dope selenium compound, selenium or selenium compound doped with As or Te, selenium doped with an alkali metal, a selenium compound doped an alkali metal, selenium doped with a halogen, a selenium compound doped with a halogen, and selenium or selenium compound doped with a combination of As, Te, an alkali metal and a halogen.

3. A radiation detector as defined in claim 1, wherein said semiconductor comprises a polycrystalline material selected from compound semiconductors such as CdTe, CdZnTe, $PbI_2$, $HgI_2$, TlBr and GaAs, and said compound semiconductors doped with a halogen.

4. A radiation detector as defined in claim 1, wherein said light irradiating mechanism includes planar light guide means, and linear light emitting means attached to some ends of said planar light guide means.

5. A radiation detector as defined in claim 4, wherein said planar light guide means includes a light diffusing sheet, a light reflecting sheet, and a transparent plate interposed therebetween, said light diffusing sheet being disposed opposite said split electrodes.

6. A radiation detector as defined in claim 4, wherein said linear light emitting means is a direct light emitting device for directly radiating light of a particular wavelength.

7. A radiation detector as defined in claim 4, wherein said linear light emitting means is an indirect light emitting device combined with a phosphor for indirectly radiating light of a particular wavelength according to said phosphor.

8. A radiation detector as defined in claim 1, wherein said light irradiating mechanism includes planar light emitting means.

9. A radiation detector as defined in claim 8, wherein said planar light emitting means comprises a direct light emitting device arranged in a plane for directly radiating light of a particular wavelength.

10. A radiation detector as defined in claim 8, wherein said planar light emitting means is formed directly on a transparent substrate.

11. A radiation detector as defined in claim 8, wherein said planar light emitting means comprises an indirect light emitting device combined with a phosphor for indirectly radiating light of a particular wavelength according to said phosphor.

12. A radiation detector as defined in claim 11, wherein said planar light emitting means has a substrate acting as a light emitting surface thereof, said split electrodes being formed on an upper surface of the said planar light emitting means, said semiconductor being formed over said split electrodes.

13. A radiation detector for detecting a spatial distribution of incident radiation, comprising:
    a radiation-sensitive semiconductor;
    a common electrode formed on one surface of said semiconductor for receiving a bias voltage;
    a plurality of split electrodes formed on the other surface of said semiconductor for outputting, as electric signals, charges generated within said semiconductor by the incident radiation;
    a carrier selective intermediate layer formed at least between said semiconductor and said split electrodes; and
    a light irradiating mechanism for emitting light at least during a detection of the incident radiation, the emitted light having a wavelength sufficient to cause charges generated by the emitted light in said semiconductor to collect in areas between the plurality of split electrodes and to distort lines of electric force and suppress change in the distorted lines of electric force during the emission of light from said light irradiating mechanism.

14. A radiation detector as defined in claim 13, wherein said intermediate layer comprises an amorphous material selected from non-dope selenium or non-dope selenium compound, selenium or selenium compound doped with As or Te, selenium doped with an alkali metal, a selenium compound doped an alkali metal, selenium doped with a halogen, a selenium compound doped with a halogen, and selenium or selenium compound doped with a combination of As, Te, an alkali metal and a halogen.

15. A radiation detector as defined in claim 13, wherein said intermediate layer comprises a polycrystal of one of compound semiconductors of $Sb_2S_3$, $CeO_2$, CdS, CdSe, CdTe, CdZnTe, ZnSe, ZnTe, ZnS, $PbI_2$, $HgI_2$, TlBr and GaAs, one of said compound semiconductors doped with a halogen, or a combination of said polycrystals forming multiple layers.

16. A radiation detector as defined in claim 14, wherein said semiconductor comprises an amorphous material different from said intermediate layer and selected from non-dope selenium or non-dope selenium compound, selenium or selenium compound doped with As or Te, selenium doped with an alkali metal, a selenium compound doped an alkali metal, selenium doped with a halogen, a selenium compound doped with a halogen, and selenium or selenium compound doped with a combination of As, Te, an alkali metal and a halogen.

17. A radiation detector as defined in claim 15, wherein said semiconductor comprises an amorphous material selected from non-dope selenium or non-dope selenium compound, selenium or selenium compound doped with As or Te, selenium doped with an alkali metal, a selenium compound doped an alkali metal, selenium doped with a halogen, a selenium compound doped with a halogen, and selenium or selenium compound doped with a combination of As, Te, an alkali metal and a halogen.

18. A radiation detector as defined in claim 15, wherein said semiconductor comprises a polycrystalline material different from said intermediate layer and selected from compound semiconductors such as CdTe, CdZnTe, $PbI_2$, $HgI_2$, TlBr and GaAs, and said compound semiconductors doped with a halogen.

19. A radiation detector as defined in claim 13, wherein said light irradiating mechanism includes planar light guide means, and linear light emitting means attached to some ends of said light guide means.

20. A radiation detector as defined in claim 19, wherein said planar light guide means includes a light diffusing sheet, a light reflecting sheet, and a transparent plate interposed therebetween, said light diffusing sheet being disposed opposite said split electrodes.

21. A radiation detector as defined in claim 19, wherein said linear light emitting means is a direct light emitting device for directly radiating light of a particular wavelength.

22. A radiation detector as defined in claim 19, wherein said linear light emitting means is an indirect light emitting device combined with a phosphor for indirectly radiating light of a particular wavelength according to said phosphor.

23. A radiation detector as defined in claim 13, wherein said light irradiating mechanism includes planar light emitting means.

24. A radiation detector as defined in claim 23, wherein said planar light emitting means comprises a direct light emitting device arranged in a plane for directly radiating light of a particular wavelength.

25. A radiation detector as defined in claim 23, wherein said planar light emitting means is formed directly on a transparent substrate.

26. A radiation detector as defined in claim 23, wherein said planar light emitting means comprises an indirect light emitting device combined with a phosphor for indirectly radiating light of a particular wavelength according to said phosphor.

27. A radiation detector as defined in claim 26, wherein said planar light emitting means has a substrate acting as a light emitting surface thereof, said split electrodes being formed on an upper surface of the said planar light emitting means, said semiconductor being formed over said split electrodes.

28. A radiation detector as defined in any one of claims 1 and 13, wherein said semiconductor is formed on a TFT substrate having thin film transistor switches, charge storage capacitors and said split electrodes formed on a transparent substrate.

29. A radiation detector as defined in claim 28, wherein said split electrodes are transparent or translucent to said irradiating light.

30. A radiation detector as defined in claim 13, wherein said semiconductor and said intermediate layer are formed on a TFT substrate having thin film transistor switches, charge storage capacitors and said split electrodes formed on a transparent substrate.

31. A radiation detector as defined in claim 30, wherein said split electrodes are transparent or translucent to said irradiating light.

32. A radiation detector as defined in any one of claims 1 and 13, wherein said light irradiating mechanism is controlled by an on/off switch to emit light.

33. A radiation detector as defined in claim 32, wherein light emission from said light irradiating mechanism is controlled by a control unit.

34. A radiation detector as defined in claim 33, wherein said control unit controls said light irradiating mechanism to emit light continuously or in pulse irrespective of an incidence of radiation.

35. A radiation detector as defined in claim 33, wherein said control unit controls said light irradiating mechanism to emit light only during an incidence of radiation.

36. A radiation detector as defined in claim 33, wherein said control unit controls said light irradiating mechanism to emit light immediately after cessation of an incidence of radiation until a next incidence of radiation.

* * * * *